US012803497B2

(12) United States Patent
Gerlich et al.

(10) Patent No.: US 12,803,497 B2
(45) Date of Patent: Nov. 17, 2026

(54) OPTOMECHANICAL SYSTEM FOR LIGHT REGULATION AND ELECTRICITY PRODUCTION

(71) Applicant: Insolight SA, Renens (CH)

(72) Inventors: Florian Gerlich, Lausanne (CH); Laurent Coulot, Lausanne (CH); Mathieu Ackermann, Lausanne (CH); Gaël Nardin, Lonay (CH); Noé Bory, Lausanne (CH); David Ziegler, Crissier (CH); David Lambelet, Neuchâtel (CH); Mathilde Duchemin, Lausanne (CH)

(73) Assignee: Insolight SA, Renens (CH)

( * ) Notice: Subject to any disclaimer, the term of this patent is extended or adjusted under 35 U.S.C. 154(b) by 0 days.

(21) Appl. No.: 18/842,998

(22) PCT Filed: Oct. 11, 2022

(86) PCT No.: PCT/EP2022/078300
§ 371 (c)(1),
(2) Date: Aug. 30, 2024

(87) PCT Pub. No.: WO2023/165728
PCT Pub. Date: Sep. 7, 2023

(65) Prior Publication Data
US 2025/0202419 A1 Jun. 19, 2025

(30) Foreign Application Priority Data
Mar. 3, 2022 (EP) .................................... 22160030

(51) Int. Cl.
*H02S 40/22* (2014.01)
*A01G 9/22* (2006.01)
*A01G 9/24* (2006.01)

(52) U.S. Cl.
CPC .............. *H02S 40/22* (2014.12); *A01G 9/222* (2013.01); *A01G 9/243* (2013.01)

(58) Field of Classification Search
CPC ......... H02S 40/22; A01G 9/222; A01G 9/243; A01G 9/22; Y02E 10/52; Y02P 60/12
See application file for complete search history.

(56) References Cited

U.S. PATENT DOCUMENTS

2012/0067337 A1 3/2012 Hall et al.
2020/0359571 A1 11/2020 Pan

FOREIGN PATENT DOCUMENTS

DE 2805848 8/1979
EP 3798688 3/2021
(Continued)

OTHER PUBLICATIONS

English machine translation, WO-2017022356-A1 (Year: 2017).*
(Continued)

*Primary Examiner* — Angelo Trivisonno
(74) *Attorney, Agent, or Firm* — Tucker Ellis LLP

(57) ABSTRACT

The invention concerns an optomechanical system (10*a*, 10*b*) for light regulation and electricity production, comprising a semi-transparent photovoltaic module (23) comprising a plurality of bifacial photovoltaic cells (30) arranged in rows and columns, with gaps (32) between the rows and/or columns, through which sunlight may be transmitted; at least one optical arrangement (40) located in an actuation plane (Pa, Pb) behind the semi-transparent photovoltaic module (23), and comprising at least one reflective optical element for redirecting light towards a back side of the photovoltaic module; and a control system (60) configured to operate the at least one optical arrangement (40) to adjust a projected area of said at least one reflective optical element on said actuation plane (Pa, Pb).

18 Claims, 12 Drawing Sheets

(56) References Cited

FOREIGN PATENT DOCUMENTS

| | | | | |
|---|---|---|---|---|
| FR | 3065353 | | 10/2018 | |
| JP | 2008196152 | | 8/2008 | |
| JP | 2015139388 | | 8/2015 | |
| JP | 2017018038 | | 1/2017 | |
| JP | 2017029120 | | 2/2017 | |
| JP | 2018198579 | | 12/2018 | |
| KR | 10-2148697 | | 8/2020 | |
| KR | 20220017010 | | 2/2022 | |
| KR | 10-2022-0017010 | | 3/2022 | |
| WO | WO-2017022356 | A1 * | 2/2017 | ............. H02S 40/22 |
| WO | 2019229056 | | 12/2019 | |
| WO | WO-2021108636 | A1 * | 6/2021 | ............. H10F 19/00 |
| WO | 2022162300 | | 8/2022 | |

OTHER PUBLICATIONS

International Search Report and Written Opinion in PCT/EP2022/078300, dated Feb. 2, 2023 (11 pages).
Office action in Japanese Patent Application No. 2024-549660, issued on Jun. 17, 2026, 8 pages total (with translation).
Utility Model Application No. 49-130864 (Utility Model Publication No. 51-058048), Oct. 28, 1974, 22 pages (with translation).
Utility Model Application No. 48-038721 (Utility Model Publication No. 49-138041), Apr. 2, 1973, 28 pages (with translation).

* cited by examiner

OPTOMECHANICAL SYSTEM FOR LIGHT REGULATION AND ELECTRICITY PRODUCTION

TECHNICAL FIELD

The present invention relates to the technical field of optomechanical systems, more specifically to such optomechanical systems adapted to regulate light transmission and electricity production, in particular in an agricultural installation.

BACKGROUND OF THE INVENTION

More and more, photovoltaic plants and agriculture are competing for land usage. Due to their relatively low energy conversion yield, both processes require very large open spaces with similar features such as decent amount of solar irradiance, relatively flat ground with minimal shading or obstacles, reasonable proximity with urban areas to alternatively produce electricity or grow food. Therefore, there is a strong incentive for an invention allowing both activities to take place on the same land.

Because of the warming climate, more and more types of crops require a protective structure against harsh weather events such as hail, heavy rain, frost or heat waves. These protections can range from simple shading nets to plastic tunnels, plastic greenhouses, and even high-end glasshouses. Most of these protections can effectively be replaced by photovoltaic modules mounted on a supporting structure, provided the structure is compatible with the agricultural activities performed below.

Furthermore, there is an interest in producing renewable electricity locally which can be used in energy intensive agricultural processes. For instance, the energy can be used to power heating or cooling systems, pumps for irrigation, fridges for plants storage, etc. Moreover, reducing the amount of direct incident light on the crops in warmer climates can also decrease their irrigation needs. On a greenhouse, decreasing the irradiance can reduce or even remove the need for cooling systems.

Installing conventional silicon photovoltaics (PV) modules above crops or greenhouses is one solution. Conventional PV modules are very cheap and can be produced in mass. They are, however, completely opaque and therefore shade the plants placed below them if they are not sufficiently spaced. Nevertheless, spacing them apart is not very effective, as it results in a decrease of the electricity production, and in an inhomogeneous illumination of the crops.

Another solution is to use translucent solar cells, such as organic cells, which can provide high level of translucency, specifically high light transmission. However, these technologies typically achieve very low efficiencies—well below 10%—and suffer from stability issues when exposed to harsh environments.

Moreover, for both of the solutions mentioned above, the amount of light transmitted to the crops cannot be adjusted over days or seasons, resulting in either too low or too high light levels depending on the time of the year and the climate.

Alternatively, the solar modules can be mounted on a rotating sun tracker, which are typically mounted in such a way to rotate the modules along either the east-west and/or the north-south axis. The amount of light impinging on the crops below the solar module can be adjusted by rotating the tracker in order to move the solar module shadow towards or away from the crops. The orientation control of the solar modules are known as solar tracking by means of a tracking system. This tracking system can effectively adjust the amount of light provided to the crops by either exposing the crops to full sunlight or to shadow. However, no intermediate illumination is provided. Moreover, in order to efficiently shade the crops below them, the trackers must typically have a wide angular range in particular at least +/−60°, which requires significant spacing between rows of trackers, as well as sufficient height to avoid impeding the agricultural work below by either men or machines. Due to their size and weight these systems are not compatible with greenhouse structures or rooftop installations. Additionally, due to the large spacing between rows of trackers, the crops are poorly protected from harsh weather events such as heavy rain and/or hail.

For the above reasons, there is still a need for a system capable of regulating light transmission and electricity production in an agricultural installation, providing both highly adjustable light transmission to match the amount of daylight required by the plants of the installation, and high efficiency in conversion of excess light energy to electricity.

SUMMARY OF THE INVENTION

The optomechanical system according to the invention comprises:

- at least one semi-transparent photovoltaic module comprising a plurality of bifacial photovoltaic cells arranged in rows and columns, with gaps between the rows or columns or both, the photovoltaic module being configured so that at least part of the sunlight incident on a front side thereof be transmitted through said gaps, and
- at least one optical arrangement located in an actuation plane behind the semi-transparent photovoltaic module, the optical arrangement comprising at least one reflective optical element having a reflective surface adapted to redirect at least part of the transmitted sunlight towards a back side of the semi-transparent photovoltaic module opposed to said front side,
- the optomechanical system further comprising a control system configured to operate the at least one optical arrangement to adjust a projected area of said at least one reflective optical element on said actuation plane.

The optomechanical system according to the invention integrates one or several semi-transparent photovoltaic modules in which photovoltaic cells are separated by gaps. Part of the incident sunlight impinging on the photovoltaic module(s) is collected by the cells and used for energy conversion. At the same time, another part of the incident light is transmitted through the gaps formed between the photovoltaic cells.

Advantageously, less than 50% of the surface of the at least one semi-transparent photovoltaic module is covered with photovoltaic cells. Conversely, at least 50% of the surface of the at least one semi-transparent photovoltaic module is preferably covered with gaps, that is, opened or formed of a transparent or translucent material adapted to transmit incident light, preferably with a light transmittance coefficient equal to or higher than 80%.

According to the invention, one or more optical arrangements are located behind the photovoltaic module or modules, to manage this incident light passing through the gaps, either for energy conversion or lighting underneath the system. In the present text, the terms behind or under or underneath referring to the photovoltaic module are meant to designate something located after or downstream of said module in the direction of propagation of the incident sunlight impinging on the module. The at least one optical arrangement and the at least one semi-transparent photovoltaic module are generally superimposed (either parallel or inclined with respect to each other) in a transversal direction of the system substantially perpendicular to the actuation plane.

Each optical arrangement is operatable by the control system between several configurations in which a total projected area of the optical element(s) on the actuation plane is different, this allowing adjustment of

- an amount of transmitted light reflected back towards the photovoltaic module(s), and/or
- an amount of transmitted light transmitted to underneath the actuation plane, and/or
- a direction of light reflected by the optical element(s) for a given incidence direction of the sunlight.

In the present context, the actuation plane of an optical arrangement is defined as the plane in which the reflective optical element generally extends or is movable (in the case of a single optical element) or in which the reflective optical elements are aligned (in the case of a plurality of optical elements).

An actuation plane may be either substantially parallel to the ground or substantially parallel to the at least one semi-transparent photovoltaic module. An actuation plane parallel to the photovoltaic module is advantageous to ensure that the light redirected by the optical arrangement is illuminating the back side of the photovoltaic module homogeneously, in order to avoid electrical mismatches between the plurality of interconnected photovoltaic cells. This is also beneficial to ensure that most of the transmitted light be intercepted by the optical arrangement, in an energy harvesting configuration of the optomechanical system.

In the case of a plurality of optical elements, the total projected area of the optical elements on the actuation plane is defined as the sum of the projected areas of each optical element of the optical arrangement on the actuation plane.

In the present context, a reflective optical element is to be understood generally as any optical element comprising at least one reflective surface adapted to reflect at least part of the light impinging thereon. The reflective optical element may also absorb and/or transmit another part of the light impinging thereon.

Depending on the needs, the control system may operate the optical arrangement so as to reflect a maximum of light towards a back side of the semi-transparent photovoltaic module to maximize energy production, or transmit the maximum of light underneath the optical arrangement for example to illuminate crops, or otherwise manage the light to have the best compromise between energy production and lighting requirements.

Both energy production and lighting possibilities are optimized, the amount of reflected light being maximized in an energy harvesting configuration, and the surface covered by the reflective optical elements being minimized at the same time in the lighting configuration.

As an example, the control system is configured to selectively operate the at least one optical arrangement between at least a first and a second configuration, the projected area of said at least one reflective optical element in the second configuration being less than 50% of the projected area in the first configuration, preferably less than 30% of the projected area in the first configuration, still more preferably less than 10% of the projected area in the first configuration.

According to an embodiment of the invention, an optical arrangement may comprise at least one deformable curtain comprising at least one reflective optical element, the control system being configured to reversibly at least partially retract or deploy said deformable curtain in a retracting direction parallel to the actuation plane.

By deformable is meant here that the general profile of the curtain may be modified between a retracted and deployed configuration. The term should encompass curtains being entirely deformable and curtains being piecewise deformable.

By retraction and/or deployment, the control system operates a basic adjustment of a general configuration of the curtain to adjust the area covered by the curtain in the actuation plane, and so, the effective surface of the curtain (in particular the effective reflective surface thereof) capable of intercepting light.

In a deployed configuration, the deformable curtain may have a projected area in the actuation plane equal to or greater than a projected area in the same plane of the photovoltaic module(s) of the optomechanical system. Advantageously, in its deployed configuration, the deformable curtain intercepts substantially all sunlight transmitted through the at least one photovoltaic module.

On the contrary, in a retracted configuration, the deformable curtain has a projected area which is substantially less than its projected area in the deployed configuration so that it intercepts a smallest portion of transmitted light or no transmitted light at all. A projected area of the curtain in its retracted configuration is for example 10 times less than its projected area in the deployed configuration.

In agricultural applications for instance, when the crops require maximum light transmission, the curtain may be partially or fully retracted in such a way to minimize obstruction and shading of transmitted light. Conversely, when it is desirable to maximize electricity production, the curtain may be deployed in order to maximize redirection of transmitted light towards the photovoltaic module(s).

The control system is configured to adjust a general configuration of the curtain between at least a deployed and retracted configuration, but may also be able to operate the curtain in one or several intermediate—partially retracted—general configurations.

In addition to this basic adjustment, the control system may further be configured to operate a fine adjustment of the position of the curtain in one particular general configuration (in particular but not limitatively in the deployed configuration), by moving the curtain by a distance of the order of the pitch between two photovoltaic cells of the photovoltaic module, typically equal to said pitch or comprised between half said pitch and said pitch.

As an example, the curtain may comprise a plurality of zones having different optical properties, in particular the curtain may comprise alternating reflective and more transparent zones, the pitch between two adjacent similar zones being equal to the pitch between adjacent photovoltaic cells. With the fine position adjustment of the curtain, the control system may control which zones of the curtain face the gaps between the photovoltaic cells.

The deformable curtain may be one continuous element or it may be formed of several parts linked one to the other.

Advantageously, the curtain may be partially transparent or translucent and partially reflective, over its entire surface. It may then redirect at least part of the transmitted light towards the photovoltaic module and transmit part of the remaining transmitted light towards the crops, when in its deployed position. According to a particular example, the curtain may have homogeneous reflectivity and transmission coefficients over its entire surface.

Advantageously, the deformable curtain may be at least partially flexible. For example, the deformable curtain may be formed of one continuous flexible part or of several flexible parts linked one to the other. A flexible part may for example be a flexible sheet or a web of interconnected flexible wires.

According to another example, the deformable curtain may be formed of several rigid parts movably linked one to the other.

According to still another example, the deformable substrate may be formed of one or several rigid parts and several flexible parts linked one to the other. For example, rigid parts and flexible parts may alternate regularly to form the deformable curtain.

The deformable curtain may be preformed, for example prepleated, to facilitate the deformation thereof. According to another example, the deformable curtain may be formed of several parts linked by articulated means.

The control system may comprise a folding system for folding the at least one deformable curtain. The folding system may for example be configured to fold the curtain in a concertina arrangement.

As another example, the control system may comprise a winding system for winding the at least one deformable curtain. The winding system may for example comprise a roller around which the curtain is rolled up in its retracted configuration.

More generally, the control system typically comprises a displacement system adapted for moving the deformable curtain between the retracted position and the deployed position, and an actuator for controlling said displacement system.

Such displacement system may comprise at least one transmission system for translating an end of the curtain in the retracting direction upon actuation of the actuator, said transmission system comprising:

- at least one elongated flexible component movably mounted around at least two rotatable supports and defining at least one (typically rectilinear) useful section between said supports, and
- a connecting element connecting said one end of the curtain to said useful section.

The transmission system may further comprise driving means for driving movement of the useful section in one sense or the opposite in the retracting direction based on a signal of the actuator. The driving means may for example comprise a driving wheel engaging with the elongated component. For example, the driving wheel may have a rough peripheral surface adapted to drive the elongated component by frictional contact. Or the driving wheel may be a geared wheel and the elongated component may be a corresponding geared rack. The driving means may also be configured to drive one or several rotatable supports of the transmission system and may comprise actuating means directly connected to said rotatable support(s).

To allow full deployment and retraction of the curtain, the useful section should have a length at least equal to the required maximum translation length of the end of the curtain to which it is associated.

According to a preferred embodiment, the useful section may be substantially parallel to the retracting direction.

The elongated component may be for example a strip or a belt or a cable.

A rotatable support may be for example a shaft or a wheel or a pulley.

Advantageously, the elongated component may be an endless component, such as an endless belt or cable.

According to an advantageous embodiment, both ends of at least one curtain may be movable in the retracting direction. In particular, the control system may be configured to move both ends of the at least one curtain in the retracting direction, either simultaneously or not.

In particular, both ends of the curtain may be individually movable in the retracting direction.

The deformable curtain is then retractable and deployable at its two opposite ends.

Otherwise said, each end of the curtain may be movable with respect to the other end thereof, said other end being either fixed or simultaneously moved.

According to a particular example, the control system may be configured to translate the curtain as a whole in the retracting direction, notably by jointly (i.e. simultaneously and similarly) translating both ends of said curtain.

Such translation may be possible in a retracted position of the curtain and/or a partially retracted position and/or a fully deployed position, but preferably in any position.

According to an advantageous embodiment, the control system may so allow two different control modes of the optical arrangement:

- a deployment/retraction mode, in which the effective surface of the curtain and a projected area of said curtain on the actuation plane is adjusted by moving only one end of the curtain or both ends relatively to each other (generally in opposite direction),
- a translation mode, in which the effective surface of the curtain remains constant but the position of the whole curtain is adjusted by jointly translating both ends thereof, i.e. at the same time, in the same retracting direction and sense, and on a same distance.

A displacement system for translating both ends of the curtain may in particular comprise duplicated transmission means respectively connected to a first and a second end of the curtain.

For example, the control system may comprise at least a first and a second transmission systems, each including an elongated flexible component movably mounted around at least two rotatable supports and defining at least one useful section between said supports and at least one connecting element for connecting an end of the curtain to said useful section. With such arrangement, a first end of the curtain is connected to the first transmission system and a second end of the curtain is connected to the second transmission system. Each transmission system is usually operatable by the same actuator of the optomechanical system, which actuator may be actuated either manually or automatically (by a computer system) based on results of measurements conducted by sensors.

According to a preferred embodiment, the elongated flexible component of at least one transmission system, preferably of both transmission systems, may be an endless component such as a belt or cable typically mounted around pulleys or wheels.

Advantageously, the useful sections of both components may be substantially parallel to each other and substantially parallel to the retracting direction.

Advantageously, the control system may further comprise guiding means for guiding the curtain in translation along its at least one retracting direction.

According to an embodiment, the deformable curtain or at least a part thereof may be formed of or may comprise a sheet having its upper surface comprising (preferably entirely made of) reflective material, for example of aluminium. Such embodiment is advantageous to provide a simple optical arrangement, which is easy to manufacture and does not require high precision for assembly or control. According to an advantageous example, the deformable curtain may be a woven material made of interlaced threads and/or stripes, with some or all threads and/or stripes made of reflective material, for example aluminum.

According to another embodiment, the curtain may comprise a sheet and a plurality of reflective optical elements attached to said sheet, more specifically on the surface thereof facing the photovoltaic module(s). In such case, the sheet may or may not have a reflective upper surface as mentioned hereabove.

As an example, the plurality of reflective optical elements may be disposed in rows and/or columns with or without substantial gaps therebetween.

The reflective optical elements may be either deformable (for example foldable), or entirely rigid. In order not to hinder retraction and/or deployment of the curtain, the optical elements may preferably be of small dimensions if rigid. Deformable optical elements may advantageously be configured to be pleated in conjunction with the folding of the curtain itself (the pleats of the optical elements may for example coincide with the pleats of the curtain once folded).

The curtain may be configured to be essentially flat in a deployed configuration. In a case where an upper surface thereof is a reflective surface, the curtain may then act as a flat mirror.

According to an alternative embodiment, the curtain may be configured to have a non-planar profile in a deployed configuration, for example a corrugated or ridged or crenelated profile.

According to another embodiment, the optomechanical system may include at least one optical arrangement comprising a plurality of reflective optical elements, each reflective optical element being pivotable around at least one axis, the control system being configured to operate rotation of the optical elements. In such embodiment, the amount of transmitted light provided to the crops and redirected towards the photovoltaic module is controlled by moving the optical elements around their respective rotation axes.

The at least one axis of rotation of each optical element is preferably parallel to the actuation plane. Even more preferably, the rotation axes of all optical elements of a defined optical arrangement are aligned in the actuation plane.

According to an embodiment, the axis of rotation of each optical element may be located substantially at the centre of said element, so that substantially half of said element is movable on each side of said rotation axis.

According to another embodiment, the axis of rotation of each optical element may be offset from the centre thereof. In particular, the axis of rotation may be located substantially at an end of the reflective optical element.

Advantageously, the optical elements may be rotated so that their reflective surface(s) be substantially parallel to the transmitted light in one configuration of the optical arrangement and/or perpendicular to the transmitted light in another configuration thereof. The amount of transmitted light which gets intercepted by the optical elements (or the apparent area of the optical elements "seen" by the transmitted light) may so be controlled efficiently. This embodiment is advantageous to redirect light more effectively towards the photovoltaic cells on a broader range of incidence angles, and therefore to maximize electricity production.

In a complementary manner, the control system may further be configured to translate the optical elements in at least one lateral direction parallel to the actuation plane.

The control system may be configured to operate rotation and/or translation of each optical element individually. As an alternative, the control system may be configured to operate rotation and/or translation of a plurality of optical elements collectively, preferably of all optical elements of each optical arrangement collectively.

Independently of whether it is integrated in a retractable deformable curtain, or is adjustable by rotation around a rotation axis, an optical element according to the invention may take various shapes and dimensions:

According to an example, a reflective optical element may be a flat (rigid or flexible) elongated element such as a mirror. This is advantageous to simplify manufacturing.

According to another example, a reflective optical element may comprise at least two adjacent planar angle-forming faces, in particular reflective surfaces.

It may for example be designed as an elongated triangular prism. A triangular prism has typically two opposed facets capable of reflecting transmitted light sideways, in such a way that transmitted light with small incidence angles is reflected at larger angles. This is advantageous to maximize the amount of transmitted light redirected towards the photovoltaic cells when the sun is high over the agricultural system of the present invention.

According to still another example, an optical element may have a non-planar reflective surface, in particular a curved reflective surface, especially a concave or convex reflective surface.

An optical element may for example be a portion of a cylinder or of a paraboloid. More complex shapes are advantageous to provide optical concentration and maximize the amount of transmitted light redirected towards the photovoltaic cells.

According to another embodiment, a reflective optical element may have a spectrally selective reflectivity and/or transmission. In other words, the optical layer may be designed to reflect some of the light wavelengths and transmit the other wavelengths. Preferably, the optical element is designed to transmit most of the light wavelengths that are useful for the crops (for example, within the photosynthetically active radiation part of the light spectrum), while reflecting most of the other wavelengths towards the semi-transparent photovoltaic modules for electricity production. The spectral selectivity of the optical element can be achieved by elements including, but not limited to, dichroic mirrors, band pass mirrors, long pass mirrors, short pass mirrors, dielectric films, stacks of two or more thin layers of dielectric materials, stacks of two or more thin layers of semi-conductor materials, or metallic layers.

According to a particular embodiment, the optical elements may be designed to image the transmitted light on the back side of the photovoltaic cells. In other words, the gaps between photovoltaic cells acts as an optical stop and the optical elements are designed as "imaging optics" capable of creating an image of the gap on the back side of the photovoltaic cells. This embodiment is advantageous since all the transmitted light can be redirected efficiently to the photovoltaic cells without moving the optical elements. In this embodiment, light can be transmitted to the crops either by retracting the optical arrangement, or by pivoting the optical elements in such a way to make them substantially parallel to the path of transmitted light, and therefore minimize light interception.

According to an embodiment, different reflective optical elements of one optical arrangement may have different shapes, and/or different reflectivity and/or transmission coefficients, and/or a different spectral selectivity.

According to an example, the pitch between two adjacent optical elements is equal to the pitch between two adjacent photovoltaic cells. In this manner, each optical element is equally positioned with respect to the proximate gap(s). As an alternative, the pitch between two adjacent optical elements may be different from, in particular smaller than, the pitch between two adjacent photovoltaic cells.

According to a particular example, each optical element has a maximum width, measured in a direction parallel to the actuation plane, for example in the retracting direction, substantially equal to the pitch between two adjacent photovoltaic cells measured in the same direction, in particular a width comprised between 0.8 times and 1 time the pitch between two adjacent photovoltaic cells. As an alternative, each optical element may have a maximum width, measured in a direction parallel to the actuation plane, for example in the retracting direction, smaller than the width of a photovoltaic cell, or than the width of the gap.

According to an advantageous example, the control system may further comprise distance adjusting means for adjusting a distance between the photovoltaic module and the optical arrangement in a transversal direction substantially perpendicular to the actuation plane.

The distance adjusting means may for example comprise a translation system for translating the optical arrangement in said transversal direction.

According to an advantageous embodiment, the optical elements may be translated in at least a lateral direction substantially parallel to the actuation plane, and the optical arrangement as a whole may be translated along a transversal direction preferably perpendicular to the actuation plane and hence to the lateral direction. In an embodiment, the control system can adjust both translations. This is advantageous to select at which distance the optical arrangement intercepts the transmitted light and therefore to be able to redirect a higher portion of transmitted light towards the photovoltaic cells.

According to a particular example, the optomechanical system may comprise at least two optical arrangements.

Optical arrangements may be arranged in different actuation planes one above the other. This is advantageous to provide more control on light transmission and redirection, as the transmitted light may then be intercepted and managed by both optical arrangements.

As an example, an optical arrangement in one actuation plane may for example comprise a deformable curtain as previously described, and an optical arrangement in another actuation plane may comprise a plurality of pivotable reflective optical elements. According to another example, two deformable curtains may be arranged in different actuation planes one above the other.

In complement or as an alternative, an optical arrangement may comprise at least two deformable curtains arranged in the same actuation plane.

More specifically, several deformable curtains arranged in the same plane may have at least partially coinciding paths. As an example, the curtains may be arranged and deployed in the same plane, while being retractable at two opposite ends. More specifically, the two curtains may have their (fixed) proximal ends opposite to each other in the retracting direction, with their distal ends getting closer upon deployment of one or both curtains. In operation, one curtain may be deployed at a time, or the curtains may be partially deployed simultaneously, with advantageously a gap maintained therebetween. The control system may then advantageously be configured to adjust a position and/or width of said gap by controlling retraction or deployment of one curtain or the other or both simultaneously.

While not limiting, two or more different actuation planes of the system are preferably substantially parallel to each other.

According to an advantageous embodiment, at least two curtains provided in the same actuation plane or in different actuations planes of the system may have different optical properties. In particular, the curtains may integrate different optical elements providing different optical functions.

According to an example, reflective surface(s) on each respective curtain of the system may have different shapes or arrangements. For example, each curtain may comprise reflective elongated triangular prisms with different angles, so that transmitted light can be redirected in two different directions depending if the first or second optical curtain is deployed. This is advantageous to maximize the range of angle incidence for which the optomechanical system of the present invention is able to redirect transmitted light towards the photovoltaic cells with high efficiency.

As an alternative or as a complement, the curtains may have different reflectivity and transmission coefficients. This provides more granular control on the amount of light transmitted to the crops and redirected towards the photovoltaic modules to produce electricity. For instance, a first optical curtain can offer lower reflectivity and higher transmission coefficients, while a second curtain can offer higher reflectivity and lower transmission coefficients. In this manner, deploying the first curtain, the second curtain, both, or none, provides four different levels of reflectivity and transmission to the control system, allowing the system to match crop light requirements with high precision.

As an alternative however, the at least two curtains may also be identical.

The plurality of photovoltaic cells of the semi-transparent photovoltaic module are bifacial cells, which are so capable to convert light energy redirected on the back side of the modules by the optical arrangement. Apart from this requirement, the optomechanical system is compatible with any photovoltaic cell technology. In order to maximize energy production, the photovoltaic cells are preferably chosen among high efficiency cell technologies, typically among mono-crystalline cell technologies such as PERC, PERT, TOPCON, heterojunctions or iBC. They can also be chosen from multi-junction cells made of III-V materials or tandem cells such as crystalline silicon combined with perovskite. Nevertheless, they can also be chosen from lower efficiency, cheaper cell technologies such as amorphous silicon, CIGS, organic cells, dye-sensitized cells, kesterites, etc.

In one preferred embodiment, the photovoltaic cells are half-cells, quarter-cells, or fifth-cells, in other words photovoltaic cells which have been cut in half, quarters or fifth along one dimension. The resulting cells have a reduced area and a more elongated shape. This is advantageous to provide a semi-transparent module with more homogeneous light transmission, with smaller cell segments and smaller gaps therebetween, hence forming a finer grid pattern of shade and light.

According to an example, the plurality of photovoltaic cells of each photovoltaic module may be interconnected by one or more series and/or parallel connections. This provides a photovoltaic module with a higher output voltage and/or output current.

The semi-transparent photovoltaic module may comprise a front plane and a backplane laminated respectively on top of the bifacial photovoltaic cells and immediately underneath them.

The front and backplane are generally made of transparent or translucent material. This provides a proper encapsulation and protection of the photovoltaic cells, while ensuring a high level of light transmission.

The front plane, the backplane, or both, may be made of tempered or chemically hardened glass. This is advantageous to ensure good resistance of the photovoltaic module to harsh weather events such as hail, snow, or strong wind.

As an alternative, the front plane, the backplane, or both, may be made of polymer. This is advantageous to minimize the weight of the photovoltaic module for installation over lightweight structures (such as plastic tunnel structures). Furthermore, this is advantageous to decrease the rigidity of the modules and provide modules that can be bent to fit the shape of a supporting structure with a substantially rounded shape.

According to an advantageous example, the front plane is made of tempered or chemically hardened glass, and the backplane is made of a sheet of polymer. This is advantageous to decrease the weight of the photovoltaic module, while still ensuring robustness against harsh weather events on the front side of the module.

According to an example, the semitransparent photovoltaic module(s) may comprise optical means on the front plane and/or back plane thereof for diffusing the incident sunlight or focusing the incident sunlight towards the at least one optical element.

Optical means may be either integrated in the front and/or back plane or attached to said front and/or back plane.

As an example, at least one among the front and back plane has diffusive properties. In particular, at least one among the front and back plane may support or integrate at least one diffusive optical element. This is advantageous to ensure a more homogeneous illumination of the crops growing below the agricultural system of the present invention. Diffuse light does not create shadows and illuminates leaves more homogeneously, therefore increasing the yield of photosynthesis.

As an example, the front plane, the backplane, or both may be made of diffused glass or a diffused polymer sheet.

According to another example, the semitransparent photovoltaic module(s) may comprise optical means on the front plane and/or back plane thereof, for focusing the incident sunlight towards specific zones of the optical arrangement.

According to an example, the front plane, the backplane, or both, may support or integrate at least one refractive optical element. The refractive element is, in particular, capable of substantially redirecting and focusing incident light.

The refractive optical element is for example a convex cylindrical lens or a cylindrical Fresnel lens. Such lens is capable of producing a line focus in one dimension. This is advantageous to selectively redirect some of the incident light and transmit transmitted light with a pre-defined direction, in such a way to direct transmitted light towards specific locations or optical elements located on the optical arrangement.

According to still another example, the front plane, backplane or both may support or integrate at least one diffractive optical element, in particular a plurality of diffractive optical elements, for example a diffraction network. A diffractive optical element is capable of redirecting and focusing incident light with specific incidence angles and wavelengths. It can provide optical functions based on a very thin patterned arrangement.

The optical elements may be formed into or onto the front plane and/or backplane by various high-throughput industrial processes such as glass rolling, polymer moulding, lamination of a patterned polymer arrangement onto a glass sheet, or refractive index modification of a photosensitive polymer layer laminated onto a glass sheet.

According to still another example, the front plane, the backplane or both may support or include a light shifting arrangement. A light shifting arrangement is for example capable of shifting the wavelength of incident light, more specifically of absorbing a range of wavelengths not useful for photosynthesis (such as in the green or UV spectrum) and re-emitting light with wavelengths useful for photosynthesis such as in the red or blue spectrum.

In an embodiment, the control system comprises at least one actuator, preferably an electrical actuator, and a transmission system arranged in such a way that an actuation of the actuator results in a translation or rotation of optical elements of the optical arrangement.

The transmission can for example be based on a cable and pulley system, or on a push-pull system with a transmission rod.

In one preferred embodiment, the control system comprises at least one sensor and a computer system configured to receive a signal provided by the sensor and to control the optical arrangement (via the actuator, if any) based on such signal, according to a feedback loop. The sensor is typically configured to measure or otherwise determine at least one parameter representative of the environmental conditions below or around the optomechanical system or the agricultural installation, and/or of the electrical production of the photovoltaic modules. Sensors implemented in the feedback loop may be light sensors, photosynthetic active radiation (PAR) sensors, temperature sensors, humidity sensors, wind sensors, sap flow sensors, leaf temperature sensors, power sensors, voltage sensors, current sensors, or a combination thereof.

Advantageously, the control system is centralized. More specifically, the control system is arranged in such a way that it can operate a plurality of optical arrangements or a plurality of optical elements at once. This is advantageous to minimize the number of parts and therefore decrease the cost of the optomechanical system of the present invention.

The present invention further concerns an agricultural installation comprising a supporting structure arranged above crops and at least one optomechanical system as defined hereabove, attached to said supporting structure.

The optomechanical system according to the present invention can be easily integrated into usual agricultural structures such as greenhouses or plastic tunnels.

It is compatible with various mounting systems and supporting structures. For instance, it can be easily integrated into standard glasshouse roofing systems such as Venlo, or it can be mounted onto lower and more lightweight structures such as the ones used to support plastic tunnels, plastic greenhouses or typical ground-mounted photovoltaic structures.

The supporting structure may comprise at least one roof section, preferably at least two roof sections forming an angle. Each roof section may be inclined with respect to the horizontal direction, preferably with an angle of 5 to 30 degrees.

Several photovoltaic modules may be provided on each roof section, to maximize the coverage of photovoltaic modules per unit of ground area, and therefore maximize energy production.

The lower part of the photovoltaic modules may be preferably between 2 and 4 meters above ground, i.e. high enough to leave sufficient space for the plants growing below, as well as the agricultural work of men and machines.

Each roof section may be facing substantially towards the east, the west, the south or the north direction.

In the case of several roof sections facing different directions, it may be advantageous to adjust a cell/gap ratio of the photovoltaic modules for each roof section depending on the orientation thereof. As an example, roof sections facing towards east (morning sunshine) may be provided with more gaps than roof sections facing towards west (evening sunshine) proportionally, photosynthesis being more efficient in the morning.

At least two roof sections may be arranged symmetrically, or asymmetrically with a larger tilt angle of one roof section.

Two opposite roof sections may be facing substantially towards the east and west directions respectively, or substantially towards the south and north directions respectively. In such last configuration, the photovoltaic modules are preferably arranged only on the south-facing roof section, in order to minimize the average incidence angle of sunlight on the photovoltaic modules over the course of the year, and therefore maximize energy production per photovoltaic module. In this embodiment, the north-facing roof section of the supporting structure is advantageously covered with a transparent material, such as tempered glass or a sheet of polymer, in order to ensure proper protection of the crops against rain, hail, snow and wind. In this embodiment, the roofing is preferably asymmetric with a larger tilt angle of the north-facing roof section, in such a way to maximize the area of the south-facing roof section and therefore maximize the roof area covered by photovoltaic modules. There may also be only a roof section oriented towards the south and no roof section towards the north.

The present invention further concerns a managing method of an agricultural installation as defined hereabove, comprising at least the steps of:

- determining at least one parameter representative of environmental conditions below or around the at least one optomechanical system, and/or of an electrical production of the at least one photovoltaic module of said optomechanical system, and
- actuating the at least one optical arrangement of said optomechanical system depending on said parameter.

The managing method advantageously comprises regulating light transmission to crops and electricity production, in order to transmit the required amount of light to the crops during the growth and harvest periods, and protect the crops from excess irradiance and temperature, while maximizing electricity production with the excess sunlight.

According to a preferred embodiment, the at least one optical arrangement may comprise at least one deformable curtain, and the actuating step may then comprise at least partially retracting or deploying said deformable curtain in the retracting direction.

Advantageously, as an alternative or in addition, the actuating step may comprise translating the deformable curtain as a whole in the retracting direction.

According to a particularly advantageous embodiment, the actuating step may comprise both retraction or deployment and global translation of the deformable curtain in the retracting direction, in order to optimize the amount of direct light impinging on the crops while lowering temperature.

According to an example, the determining step may so include determining a first parameter representative of a temperature in the environment of the crops and a second parameter representative of an amount of direct light impinging on the crops, and actuating the optical arrangement(s) to minimize the first parameter and maximize the second parameter.

DETAILED DESCRIPTION OF PREFERRED EMBODIMENTS

Figure 1A:
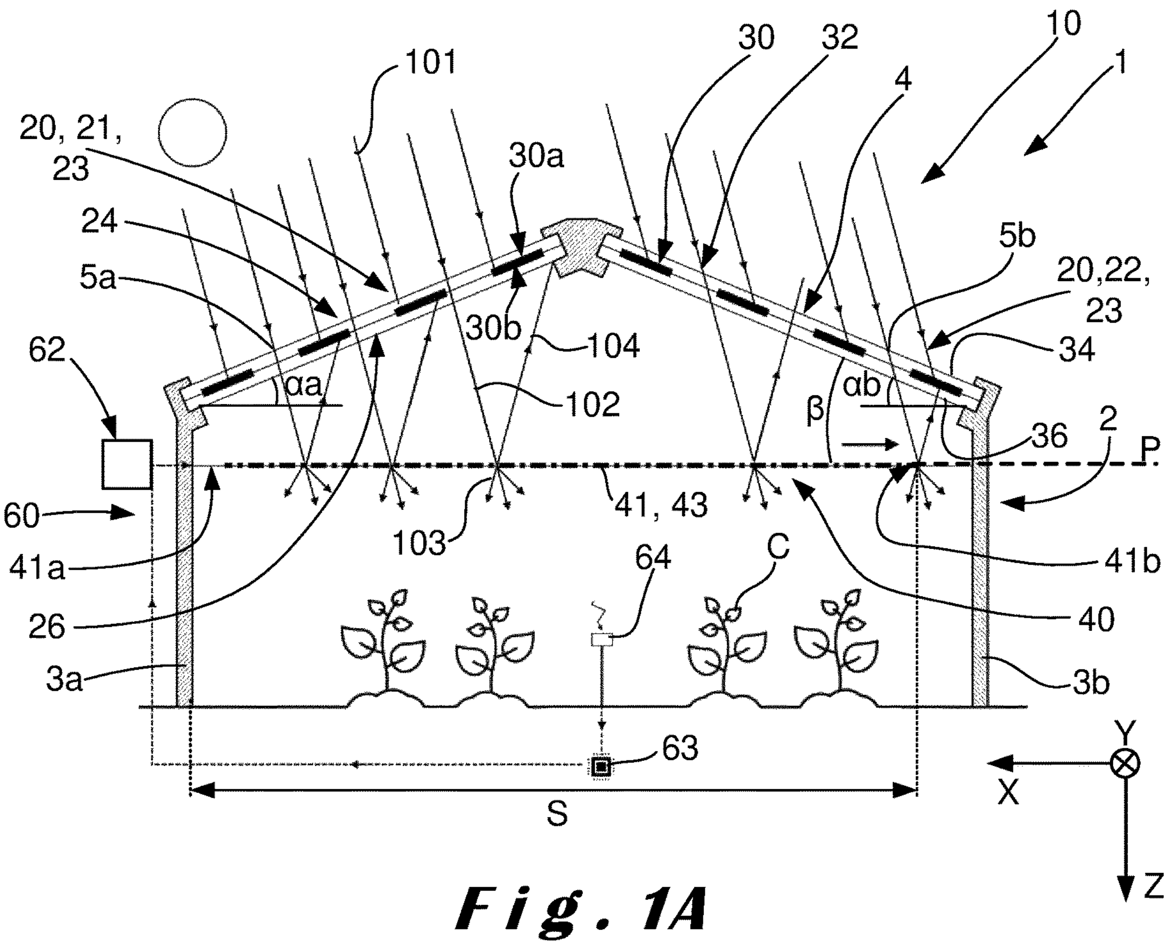
FIGS. 1A to 1C are side views schematically illustrating an agricultural installation according to a first embodiment of the invention, with the optical arrangement respectively in a deployed, in an intermediate and a retracted position.

FIG. 1A illustrates an agricultural installation 1 according to a first embodiment of the invention, comprising a supporting structure 2 arranged above crops C, and an optomechanical system 10 attached to said supporting structure 2, for managing incident sunlight 101 for energy production and/or lighting of the crops C in an optimized manner as will be described hereafter.

In the illustrated embodiment, the supporting structure 2 comprises supporting lateral walls or beams 3*a*, 3*b*, and a roof structure 4 comprising two opposite roof sections Sa, 5*b* arranged symmetrically and each inclined with respect to the horizontal by an angle respectively aa, ab comprised between 5 and 30 degrees. The height of the supporting lateral walls or beams 3*a*, 3*b* shall be large enough to leave sufficient space for the plants growing below roof sections Sa, 5*b*, as well as the agricultural work of men and machines, for example between 2 and 4 meters. The illustrated supporting structure 2 shall not be considered limiting, and any other adapted structure may be envisaged, such as a single roof section, or asymmetrical roof sections, or flat roof sections, or a structure having more than two adjacent roof sections, etc.

In the illustrated example, the optomechanical system 10 comprises a group 20 of several photovoltaic modules 23 distributed on the roof 4, here in a first set 21 of coplanar modules 23 on the left roof section 5*a* and in a second set 22 of coplanar modules 23 on the right roof section 5*b*, to maximize the coverage of photovoltaic modules per unit of ground area, and therefore maximize energy production.

In the present text, a set of photovoltaic modules is understood as one module or a plurality of adjacent coplanar photovoltaic modules. A group of photovoltaic modules may include one or several sets of modules and designates the module or modules of one optomechanical system according to the invention.

According to the invention, the photovoltaic modules 23 are semi-transparent photovoltaic modules. In the present context, a semi-transparent photovoltaic module 23 is understood as a module comprising a plurality of photovoltaic cells 30 arranged in rows and columns in a general plane of the module, with gaps 32 between the rows or columns or both to allow at least part of the sunlight incident on a front side 24 thereof to be transmitted through said gaps 32. The photovoltaic modules 23 are illustrated schematically in FIGS. 1A to 1C, and in particular the size or number of cells 30 per module are not representative. FIG. 2 is a top view showing with more precision a possible arrangement of the photovoltaic cells 30 in modules 23 of the first set 21. As illustrated, a module typically has a rectangular profile, with X cells 30 arranged in n columns in a longitudinal direction N and m rows in a lateral direction M. The cells 30 are regularly distributed and aligned in each row and each column, with the intermediate space between two adjacent cells being equal or different in the rows and columns. Between each pair of adjacent rows or columns of cells 30 are formed continuous rectilinear gaps 32, extending in both longitudinal and lateral directions N, M as a grid pattern.

Typically, less than 50% of the surface of each semi-transparent photovoltaic module 23 is covered with photovoltaic cells 30. Conversely, at least 50% of the surface of each semi-transparent photovoltaic module 23 is advantageously covered with gaps 32, that is, opened or formed of a material adapted to transmit incident light, preferably with a light transmittance coefficient equal to or higher than 80%.

According to the present invention, the photovoltaic cells 30 of each semi-transparent photovoltaic module 23 are bifacial cells i.e. they each have an active front face 30*a* capable of collecting and converting light energy incident at the front side 24 of the module 23 into electrical energy, and an active rear face 30*b* capable of collecting and converting light energy incident at the back side 26 of the module 23 into electrical energy. These cells 30 are preferably chosen among high efficiency cell technologies, typically among mono-crystalline cell technologies such as PERC, PERT, TOPCON, heterojunctions or iBC. According to an advantageous embodiment, they may be half-cells, quarter-cells, or fifth-cells, i.e. cells which have been cut in half, quarters or fifth along one dimension.

The photovoltaic cells 30 are typically encapsulated between a front plane 34 and a backplane 36 of their respective module 23, said front and backplanes 34, 36 being typically planar sheets, generally made of transparent or translucent material, such as tempered or chemically hardened glass or polymer.

The optomechanical system 10 further comprises an optical arrangement 40 in an actuation plane P located behind the semi-transparent photovoltaic modules 23 in the propagation direction of the sunlight 101. In the example, the optical arrangement 40 extends under both roof sections Sa, 5*b*, and the actuation plane P is horizontal, so that it forms an angle β=αa=αb with each set 21, 22 of photovoltaic modules 23. As an alternative, one optical arrangement may be associated with one module or one set of coplanar modules and/or the actuation plane P thereof may be parallel to said modules 23 (see for example the arrangement of FIG. 8 described hereafter).

In the illustrated embodiment, the optical arrangement 40 comprises a deformable curtain 41, here in the form of a continuous flexible sheet 43 made of a partially translucent and partially reflective material, such as for example a woven material made of interlaced threads and/or stripes, with some or all threads and/or stripes made of reflective material, for example aluminum. In such case, density of the reflective threads and stripes define the global transmission of the sheet. According to another embodiment, the flexible sheet may be formed of a monolithic material having adapted optical properties.

In the example, the sheet 43 forms, as such, a reflective optical element with its upper surface 43*a* being a reflective surface. The incident sunlight 101 transmitted through the gaps 32 of the photovoltaic modules 23 and impinging on the curtain 41 is partially transmitted underneath the curtain 41, to illuminate crops C (103) and partially reflected back towards a back side 26 of the photovoltaic module 23, and so towards back faces of the bifacial photovoltaic cells 30.

FIG. 1A illustrates the curtain 41 in a fully deployed configuration. In this configuration, the sheet 43 is essentially flat. Furthermore, a projection area S of the flexible sheet 41 on the actuation plane P is at least substantially equal and preferably larger than a total projection area, in the same plane P, of the plurality of modules 23 to which it is associated for light management.

According to the invention, the optical arrangement 40 is associated to a control system 60 configured to change a position or configuration thereof to adjust a total projected area S of the reflective optical element(s)—here the curtain 41—on the actuation plane P.

In this first embodiment, the control system 60 is configured to reversibly at least partially retract or deploy the deformable curtain 41 in a retracting direction.

The flexible sheet 41 may be preformed, for example prepleated, to facilitate deformation thereof.

For the following description are defined:

- a transversal direction Z, perpendicular to the actuation plane P,
- a lateral direction X or retracting direction, perpendicular to the transversal direction Z and in which a dimension of the or each reflective optical element is adjustable by actuation of the control system 60,
- a longitudinal direction Y orthogonal to the transversal and lateral directions Z, X.

Moreover, with reference to the curtain 41 of said first embodiment, a proximal or first end 41*a* is a lateral end of said curtain remaining substantially fixed upon actuation of the optical arrangement 40, and the distal or second end 41*b* thereof corresponds to said end being translated during retraction or deployment.

However, this arrangement should not be considered limiting, and the invention also encompasses embodiments where both first and second ends are movable, as will be described for example with reference to FIGS. 14A to 14C.

In the illustrated embodiment, the control system 60, configured to reversibly retract and deploy the curtain 41 in the lateral or retracting direction X, comprises a folding system 70 for retracting the flexible sheet 41 towards a proximal end thereof 41*a* by folding, and an actuator 62 for controlling said folding system 70.

As shown in FIG. 2, the folding system 70 typically comprises a transmission system 72 for translating the distal end 41*b* of the curtain 41 towards the proximal end 41*a* thereof upon actuation of the actuator 62. The transmission system may for example comprise a push-pull system with a transmission rod or rack 73 attached to the distal end 41*b* of curtain 41 and driven in translation for example by a rotating pinion 74. According to an alternative example, the transmission system may be based on a cable and pulley system of the type described with reference to FIGS. 15A to 15D or equivalent.

A guiding system 76, comprising for example one or more steel cable 77 and corresponding guides 78, may further help guiding the translation of the curtain 41 in the retracting direction X.

An actuator 62 of the control system 60 may be operated manually and is, in that case, preferably an electrical actuator.

In the preferred illustrated embodiment, however, the actuator 62 is operated automatically. More specifically, the control system 60 is a self-driven system operating according to a feedback loop. The system 60 includes a computer system 63 in communication with at least one sensor 64, with the computer system 63 being configured to actuate the actuator 62 depending on a parameter determined by the sensor 64. The feedback loop can provide information on the environmental conditions below or around the agricultural installation, and/or on the electrical production of the photovoltaic modules 23, and the control system 60 may manage the optical arrangement depending on said information. The sensor 64 is for example a light sensor, photosynthetic active radiation (PAR) sensor, temperature sensor, humidity sensor, wind sensor, sap flow sensor, leaf temperature sensor, power sensor, voltage sensor, current sensor.

Figure 1B:
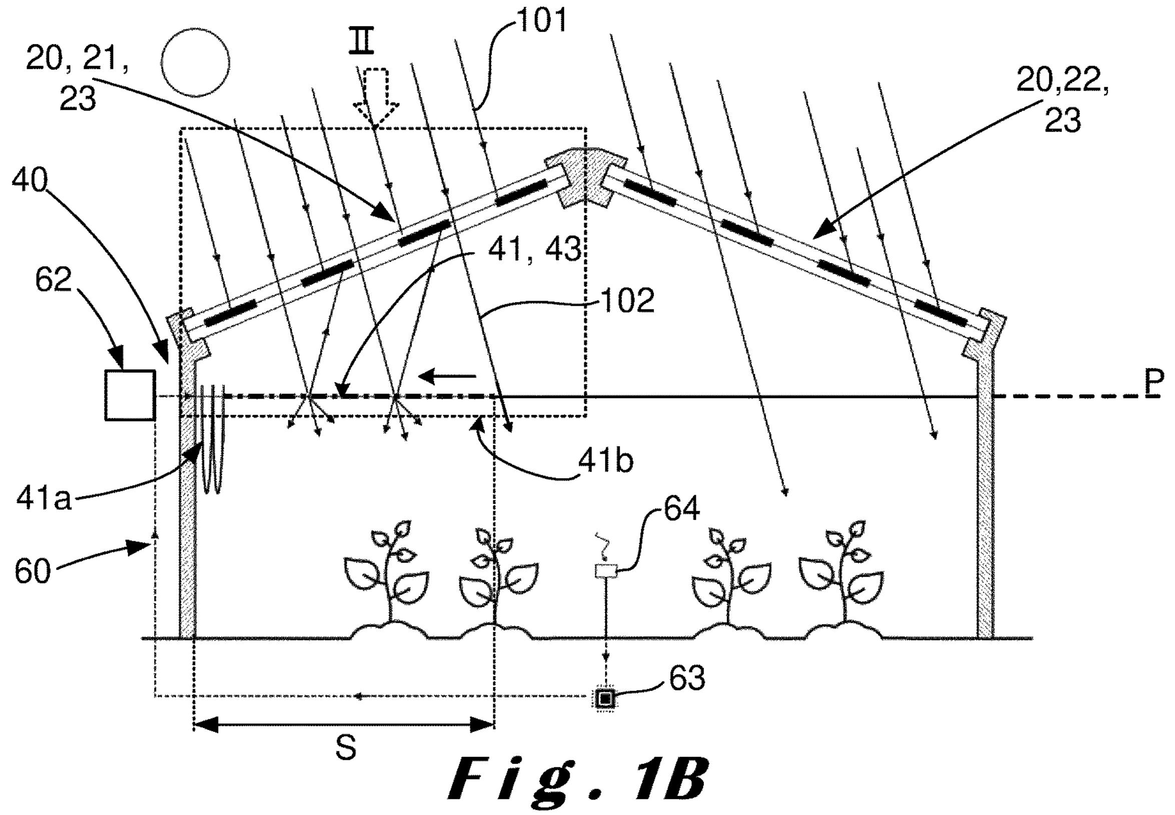
Figure 1C:
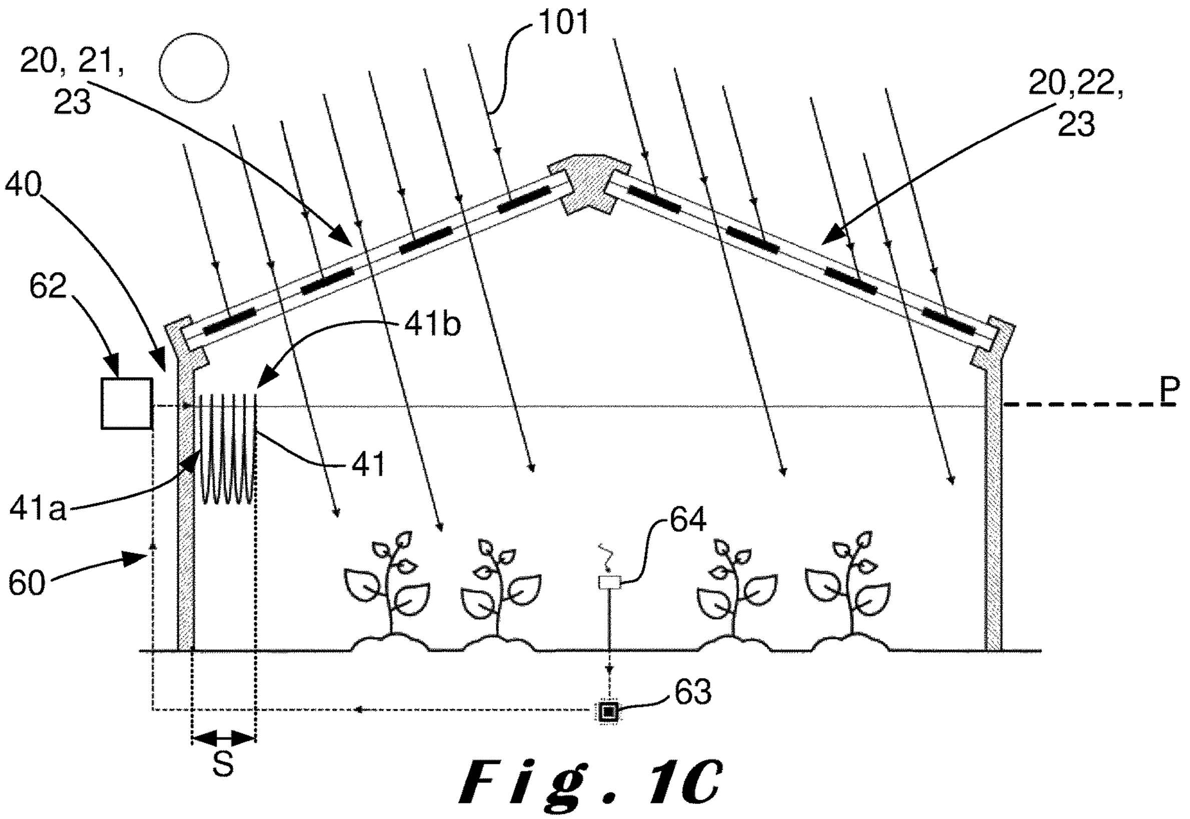
Figure 2:
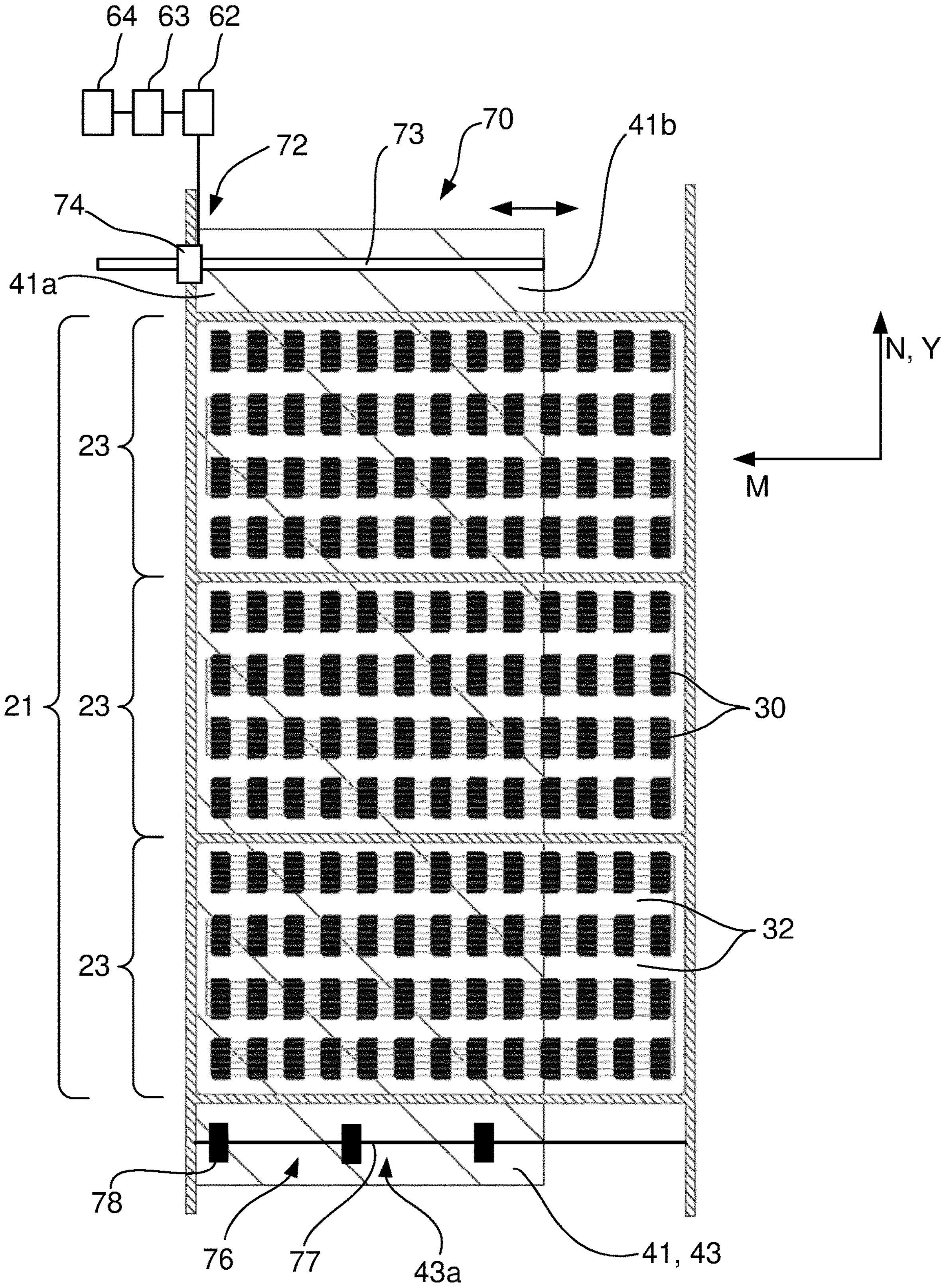
FIG. 2 is a top view of zone II identified on FIG. 1B, FIG. 3 schematically illustrates an agricultural installation with an optomechanical system according to a second embodiment of the invention, FIG. 4 schematically illustrates an optomechanical system according to a third embodiment of the invention, FIG. 5 schematically illustrates an optomechanical system according to a fourth embodiment of the invention.

FIGS. 1B and 2 illustrate the flexible curtain 41 in a semi-retracted configuration, and FIG. 1C illustrates the flexible curtain 41 in a fully retracted configuration, in which it is folded in a concertina arrangement. In its retracted configuration, a projected area S of the curtain 41 on the actuation plane P is very small and preferably substantially zero, so that it does no longer interfere with the transmitted sunlight 102, which is so transmitted to the crops C underneath the system 10.

In agricultural applications for instance, when the crops C require maximum light transmission, the curtain 41 may be partially or fully retracted in such a way to minimize obstruction and shading of transmitted light 102. Conversely, when it is desirable to maximize electricity production, the curtain 41 may be deployed in order to maximize the amount of light (104) reflected towards the photovoltaic module(s).

Figure 3:
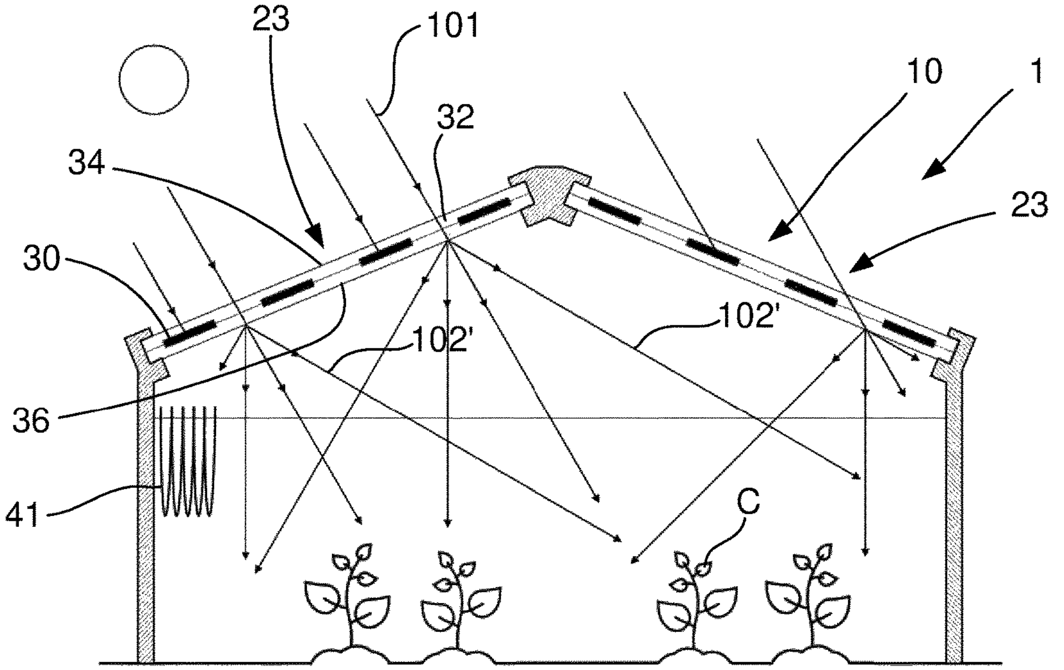
Figure 4:
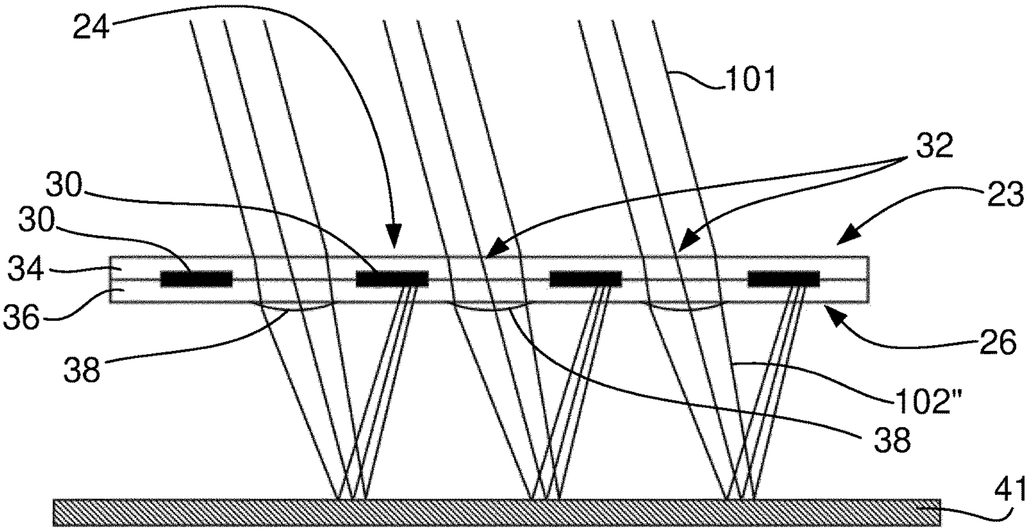

FIGS. 3 and 4 illustrate particular configurations of semi-transparent photovoltaic modules 23 with the front plane 34, the backplane 36, or both, having advantageous optical properties.

For example, FIG. 3 illustrates an optomechanical system 10 according to a second embodiment of the invention, with each semi-transparent photovoltaic module 23 comprising a front plane 34 and a backplane 36 both having diffusing properties, for diffusing the incident sunlight. This is advantageous to ensure a more homogeneous illumination of the crops growing below the optomechanical system of the present invention. Diffuse light 102' issuing from the photovoltaic modules 23 does not create shadows and illuminates leaves of crops C more homogeneously, therefore increasing the yield of photosynthesis.

As an example, the front plane 34, the backplane 36, or both may be made of diffused glass or a diffused polymer sheet.

FIG. 4 illustrates an optomechanical system 10 according to a third embodiment, where the backplane 36 of a semi-transparent photovoltaic module 23 supports refractive optical elements 38 capable of substantially redirecting and focusing incident light.

Each refractive optical element 38 advantageously faces a gap 32 between two photovoltaic cells 30. The refractive optical element 38 is for example a convex cylindrical lens or a cylindrical Fresnel lens. Such lens is capable of producing a line focus in one dimension. This is advantageous to selectively redirect some of the incident light 101 and transmit light 102" with a pre-defined direction, towards specific locations of the optical arrangement.

According to another (not illustrated) example, the backplane 36 may support or include at least one diffractive optical element, in particular a plurality of diffractive optical elements, for example a diffraction network. A diffractive optical element is capable of redirecting and focusing incident light with specific incidence angles and wavelengths. It can provide optical functions based on a very thin patterned arrangement.

Figure 5:
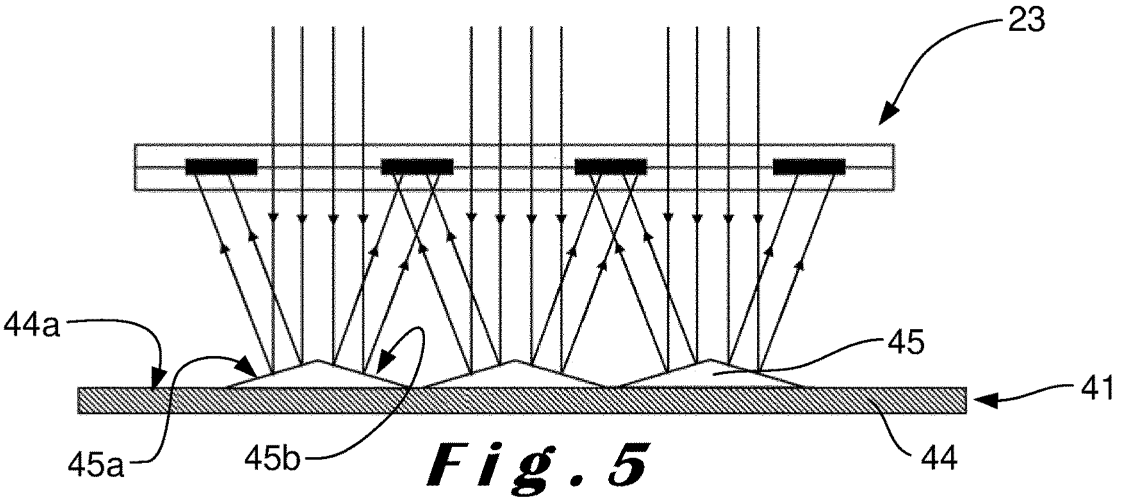

FIG. 5 illustrates an optical arrangement 40 according to a further embodiment of the invention. The optical arrangement 40 here comprises a deformable curtain 41 formed of a flexible sheet 44 having no light reflective properties as such but with a plurality of reflective optical elements 45 attached to the upper surface 44*a* thereof.

In the illustrated embodiment, the optical elements 45 are designed as elongated triangular prisms, each having two opposed facets 45*a*, 45*b* capable of reflecting transmitted light sideways, in such a way that transmitted light with small incidence angles is reflected at larger angles.

In this example, the optical elements 45 are rigid elements, in particular solid elements for example made of polymer material.

The plurality of reflective optical elements 45 may be disposed on the supporting sheet 44 in rows and/or columns with substantial gaps between them, as illustrated in FIG. 5, or they may be juxtaposed without gaps.

The illustrated embodiment is not limiting, and the optical elements 45 attached to the flexible sheet 44 may take any other adapted configuration or shape. Instead of being rigid, the deformable optical elements 45 may also be deformable, and in particular, they may be foldable. In such case, the pleats of the optical elements 45 may coincide with the pleats of the deformable substrate 44 once folded. Also, different optical elements may be attached to sheet 44, in particular elements having different optical properties, such as different reflectivity and/or transmission coefficient or different tilt angles. Also, the flexible sheet 44 itself may have reflective properties, with part of or its entire upper surface 44*a* made of reflective material.

Figure 6A:
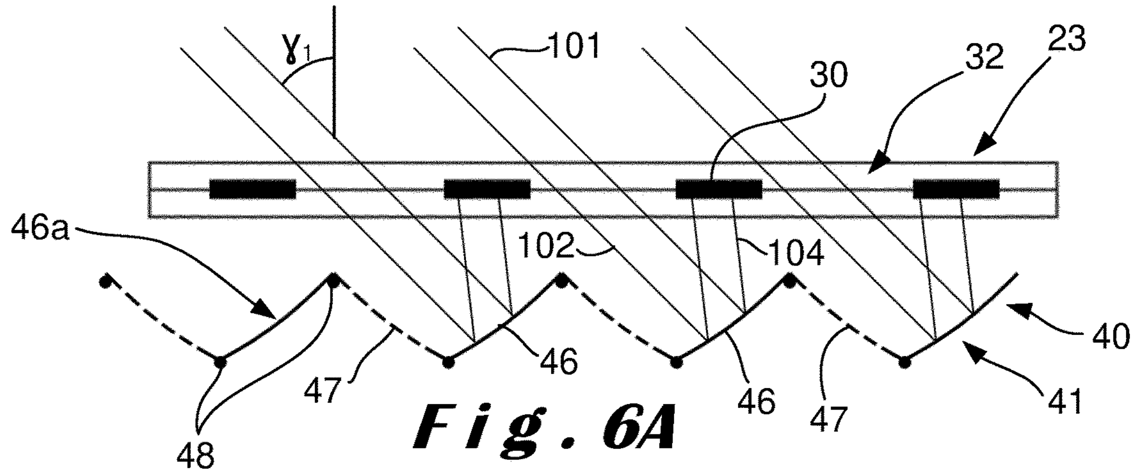
FIGS. 6A to 6C are side views schematically illustrating an optomechanical system according to a fifth embodiment of the invention, with FIGS. 6A and 6B illustrating interaction of the optical arrangement in the deployed position with sunlight having different incidence angle and FIG. 6C illustrating the optical arrangement in a retracted position, FIG. 7 schematically illustrates an optomechanical system according to a sixth embodiment of the invention.
Figure 6B:
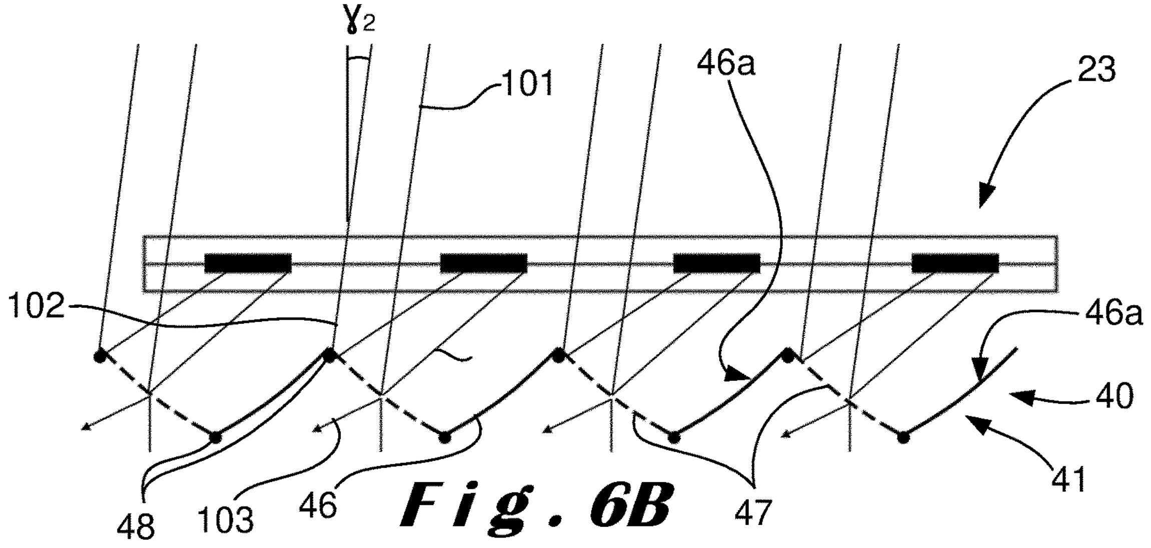
Figure 6C:
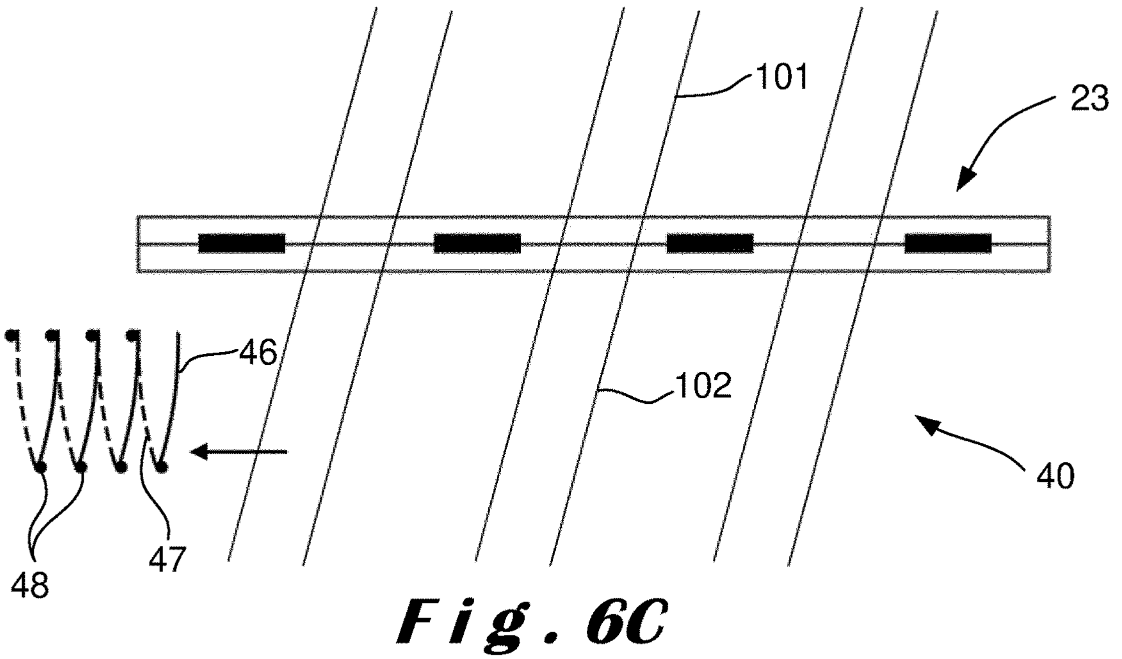

FIGS. 6A to 6C illustrate a fifth embodiment of the invention, where an optical arrangement 40 is formed of a deformable curtain 41 having a ridged profile forming a plurality of adjacent planar angle-forming faces, in a deployed configuration (FIGS. 6A and 6B).

In the particular illustrated embodiment, the curtain 41 is formed of alternating parts or zones 46, 47 of different flexible materials, with adjacent parts being linked together by articulated means 48, for example pivoting rods. In the example, the curtain 41 is formed of reflective parts 46 made of a flexible sheet material with an upper reflective surface 46*a*, alternated with large mesh web bands or perforated flexible sheets 47. An advantage of the non-planar profile of the curtain 41 is the opportunity to adjust an angle of inclination of the reflective surfaces 46*a* by deploying the curtain 41 more or less.

As shown in FIGS. 6A and 6B, depending on the incidence angle of the incident sunlight 101, the light 102 transmitted through the photovoltaic module 23 may either be intercepted by the reflective surfaces of the reflective parts 46 (FIG. 6A with incidence angle $\gamma 1$) and reflected back (104) towards the cells 30, or they may be intercepted by the opened parts 47 (FIG. 6B with incidence angle $\gamma 2$) and further transmitted (103) to underneath the system. FIG. 6C shows the retracted configuration of the curtain 41.

This embodiment is also not limiting, and the deformable curtain could be formed of several rigid parts movably linked one to the other, or of alternating rigid parts and flexible parts. Also, the profile of the optical arrangement in its deployed position may be different: flat and/or corrugated and/or crenelated, etc.

Figure 7:
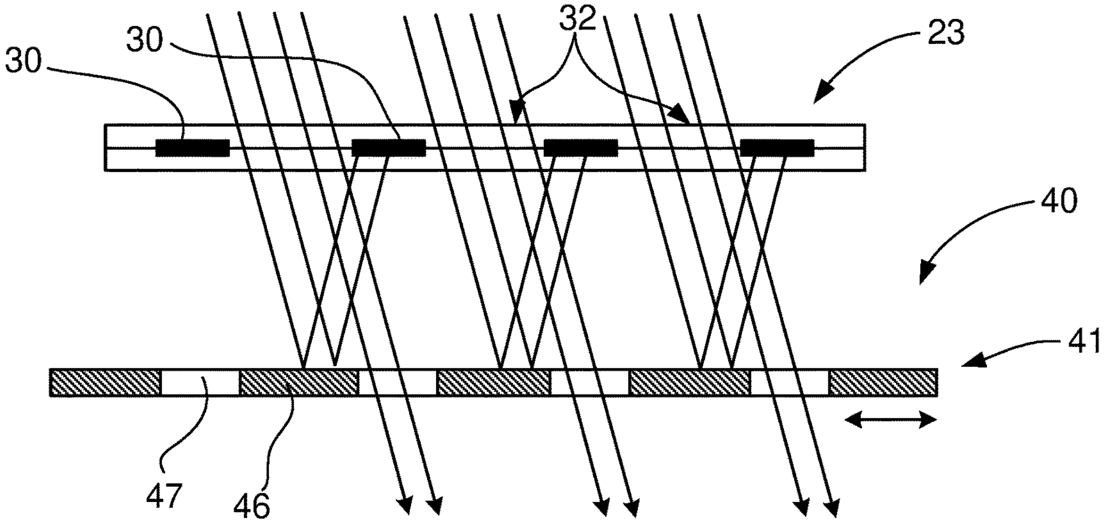

FIG. 7 schematically illustrates an optomechanical system according to a sixth embodiment of the invention, where an optical arrangement 40 is formed of a deformable curtain 41 configured to be essentially flat in a deployed configuration, and comprising alternating zones or stripes 46, 47 having different optical properties, especially different reflectivity coefficients. In the particular example, reflective zones 46 alternate regularly with more transparent zones 47, the pitch between two adjacent zones being equal to half of the pitch between adjacent photovoltaic cells 30 (i.e. the pitch between two adjacent similar zones being equal to the pitch between adjacent photovoltaic cells 30). The reflective and transparent zones 46, 47 may or may not have the same width.

For a given general configuration of the curtain, the control system 60 may advantageously be configured to operate a fine adjustment of the position of the curtain 41 by moving the curtain 41 by a distance equal to the pitch between two photovoltaic cells 30 of the photovoltaic module 23: in a first position (as illustrated in FIG. 7), reflective zones 46 of the curtain 41 may be positioned facing the gaps 32, so as to maximize the amount of transmitted light reflected back towards the photovoltaic cells 30. In a second position, the more transparent zones 47 may be positioned facing the gaps 32, to maximize the amount of light transmitted under the system 10, for example to the crops in an agricultural installation.

The same fine position adjustment of the curtain 41 may be envisaged with other types of curtains, such as described for example with reference to FIG. 5 or 6A to 6C.

Figure 8:
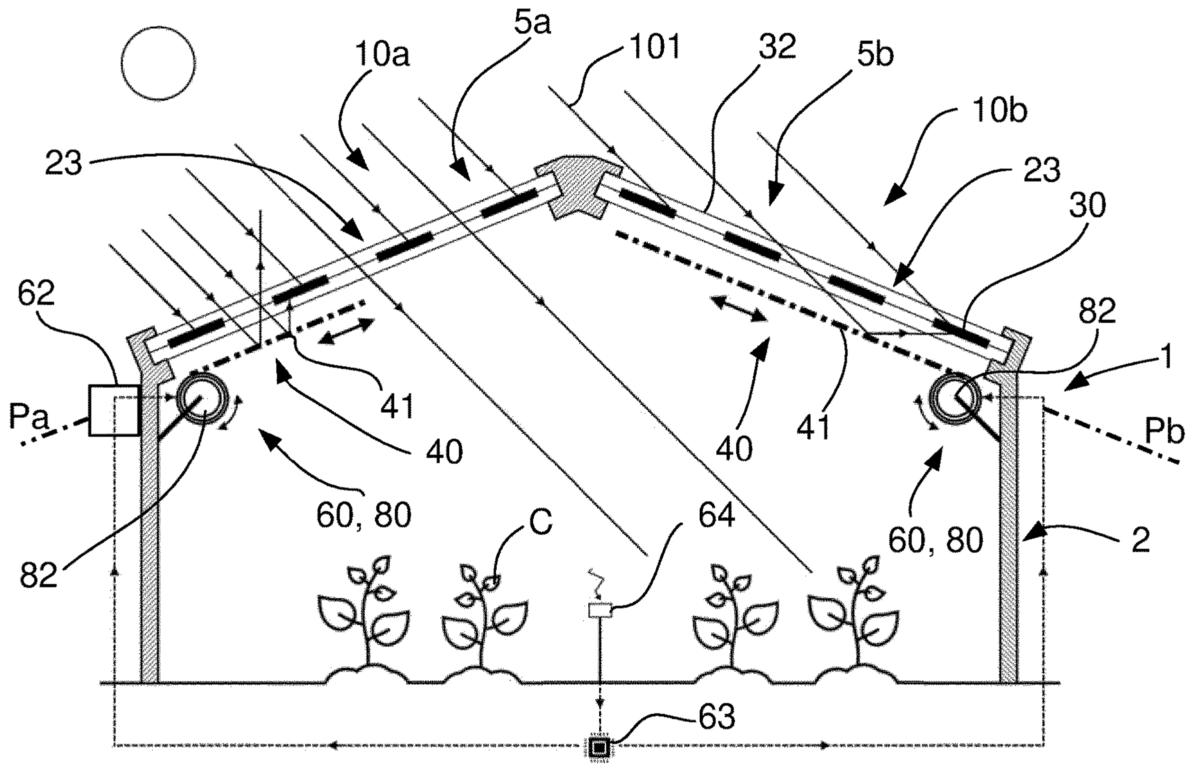
FIG. 8 is a side view illustrating an agricultural installation with an optomechanical system according to a seventh embodiment of the invention.

Retraction of such curtain by folding is also not limiting, and FIG. 8 schematically illustrates an installation 1 according to a seventh embodiment, including two similar optomechanical systems 10*a*, 10*b* for managing incident light 101 on each roof section Sa, 5*b* of the supporting structure 2 of the installation 1.

Each optomechanical system 10*a*, 10*b* here includes an optical arrangement 40 in the form of a deformable curtain 41 for example of the type described before, translatable in an actuation plane Pa, respectively Pb, and a control system 60 comprising a winding system 80 for winding said curtain 41.

In the illustrated example, the winding system 80 comprises a roller 82 around which the curtain 41 is rolled up in its retracted configuration.

For guiding the curtain 41 in translation along its retracting direction the control system 60 may further comprise guiding means (not illustrated) similar to those described with reference to FIG. 2.

The roller 82 is adapted to be rotated, either in the sense of retraction or deployment of the curtain 41, upon actuation of the actuator 62 (notably by the computer system 63 depending on parameter(s) measured by sensors 64).

FIG. 8 further illustrates that the actuation plane Pa, Pb of an optical arrangement 40 may also be substantially parallel to the semi-transparent photovoltaic module(s) 23 to which it is associated. Such configuration may be advantageous as most of the transmitted light can be intercepted by the optical arrangement 40, and light redirected by the optical arrangement 40 illuminates the back side of the photovoltaic module 23 more homogeneously.

Figure 9:
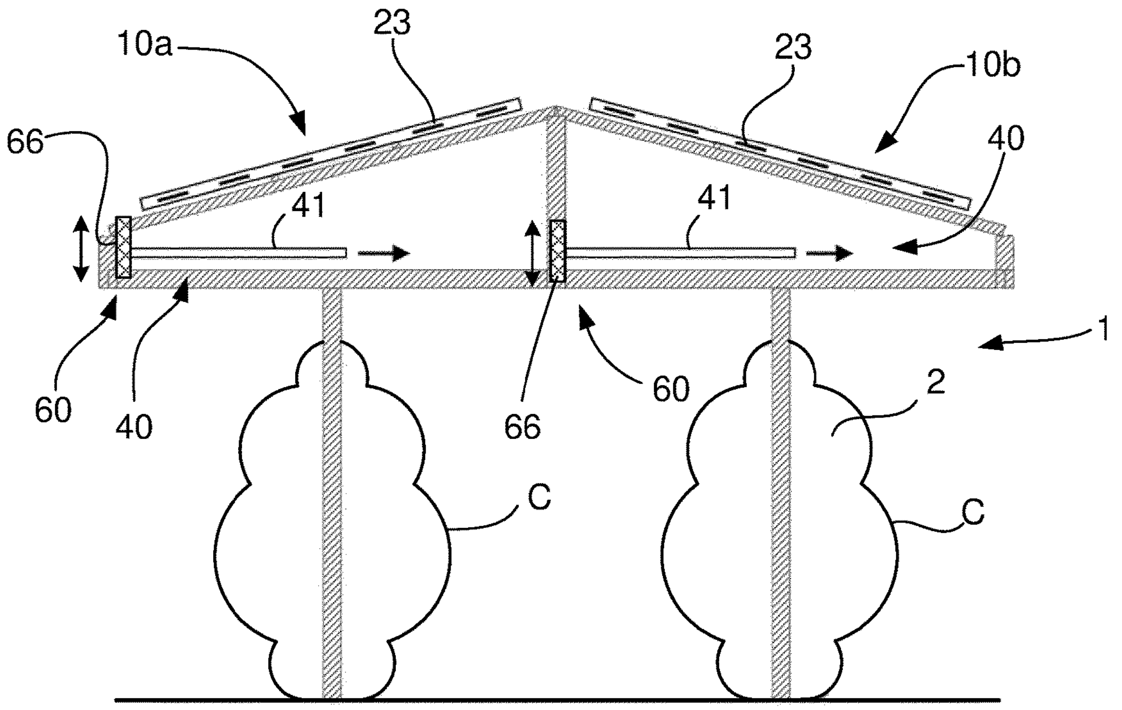
FIG. 9 is a side view of an agricultural installation according to a eighth embodiment of the invention.

Independently of whether the actuation plane P is parallel to the photovoltaic modules 23 or to the ground, the control system 60 may advantageously comprise a distance adjusting system 66 for adjusting a distance d between the photovoltaic module 23 and the optical arrangement 40 in the transversal direction Z, i.e. perpendicularly to the actuation plane P. Such distance adjusting system is illustrated in FIG. 9. This is advantageous to increase the amount of light redirected towards the back side 30*b* of the photovoltaic cells 30 for specific light incidence angles.

Figure 10:
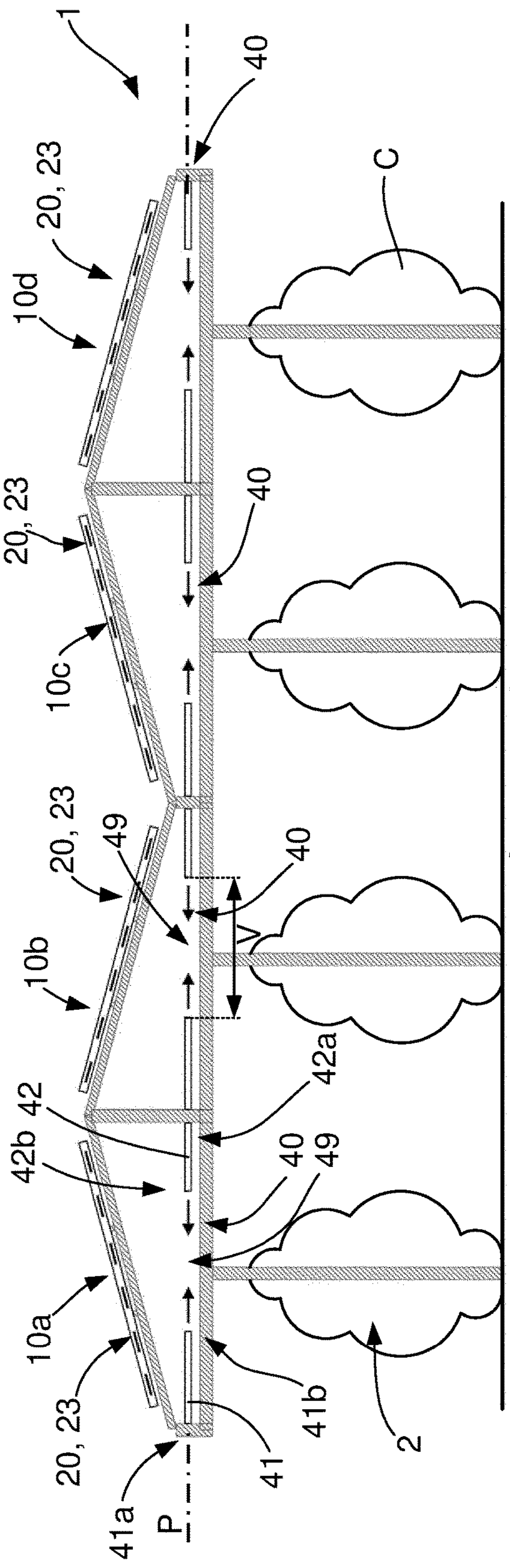
FIG. 10 is a side view of an agricultural installation according to an ninth embodiment of the invention.

FIG. 10 illustrates an agricultural installation 1 comprising several optomechanical systems 10*a*, 10*b*, 10*c*, 10*d* according to a ninth embodiment of the invention, where each optical arrangement 40 associated to a group of photovoltaic modules 23 comprises two deformable curtains 41, 42.

Both curtains 41, 42 are respectively located in a same actuation plane P, and are retractable and deployable in said actuation plane P, with coinciding paths: The proximal end 41*a* of the first curtain 41 is located at a first side of the group 20 of photovoltaic modules 23 and the proximal end 42*a* of the second curtain 42 is located at a second side of the group of modules 23. When in its deployed configuration, the first curtain 41 has its distal end 41*b* in the vicinity of proximal end 42*a* of the second curtain 42, and conversely, in its deployed configuration, the second curtain 42 has its distal end 42*b* in the vicinity of proximal end 41*a* of the first curtain 41. In such manner, the first curtain 41 can be fully deployed when the second one 42 is fully retracted, and vice versa.

The two curtains 41, 42 may have different optical properties. For example, both curtains 41, 42 may be provided with optical elements having different shapes or arrangement. As an example, each curtain 41, 42 may comprise reflective elongated triangular prisms with different angles, so that transmitted light can be redirected in two different directions depending if the first or second curtain is deployed. This is advantageous to maximize the range of angle incidence for which the optomechanical system of the present invention is able to redirect transmitted light towards the photovoltaic cells with high efficiency.

As an alternative or as a complement, the optical elements of the two curtains 41, 42 may have different reflectivity and transmission coefficients. This provides more control on the amount of light transmitted to the crops C and redirected towards the photovoltaic modules 23 to produce electricity. For instance, the first curtain 41 can offer lower reflectivity and higher transmission coefficients, while the second curtain 42 can offer higher reflectivity and lower transmission coefficients.

According to an embodiment, only one curtain 41, 42 may be deployed at a time.

In this manner, deploying the first curtain, the second curtain, or none, provides three different configurations of the optical arrangement 40.

In addition, the optical arrangement 40 may be configured such that the curtains 41, 42 be partially deployed simultaneously, with advantageously a gap 49 maintained therebetween in the lateral direction. The control system 60 may then be configured to adjust a position and/or width of said gap 49 by controlling one curtain 41, 42 or the other or both simultaneously. The width v of the gap 49 is the distance between the respective distal ends 41*b*, 42*b* of both curtains 41, 42 facing in the lateral direction X.

Although optical arrangements with only two curtains have been illustrated, the number of curtains should not be seen as limiting.

Figure 11:
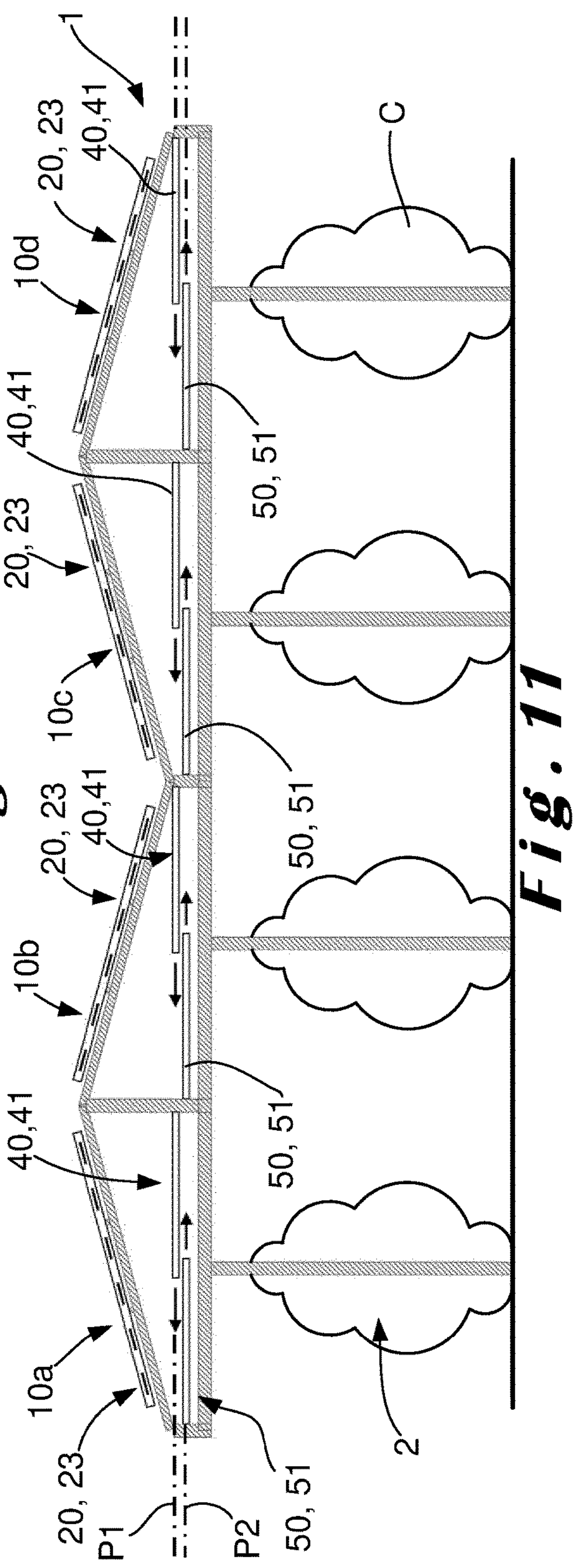
FIG. 11 is a side view of an agricultural installation according to a tenth embodiment of the invention, FIGS. 12A and 12B schematically illustrate an optomechanical system according to a eleventh embodiment of the invention, FIGS. 13A and 13B schematically illustrate an optomechanical system according to an twelfth embodiment of the invention, FIGS. 14A to 14C schematically illustrate an optomechanical system according to a thirteenth embodiment of the invention, FIGS. 15A to 15D schematically illustrate an example of a curtain displacement system for implementing for example the thirteenth embodiment of FIGS. 14A to 14C.

FIG. 11 illustrates an agricultural installation comprising several optomechanical systems 10*a*, 10*b*, 10*c*, 10*d* according to a tenth embodiment of the invention, where each optomechanical system comprises more than one optical arrangement configured to interact with a same group 20 of photovoltaic modules 23.

In the embodiment of FIG. 11, two optical arrangements 40, 50 are located in different actuation planes P1, P2 underneath each group 20 of photovoltaic modules 23. In the example, each optical arrangement 40, 50 comprises a deformable curtain 41, 51 of the type previously described. This however is not limiting, and other optical arrangements according to the invention may be envisaged.

Although not limiting, both actuation planes P1, P2 are preferably substantially parallel to each other. Preferably, both optical arrangements 40, 50 have different optical properties, i.e. their optical elements have different shapes or arrangement, and/or have different reflectivity and/or transmission coefficients. As an alternative however, the at least two optical arrangements 40, 50 may also be identical.

Deploying the first curtain 41, the second optical curtain 51, both, or none, here provides four different levels of reflectivity and transmission to each optomechanical system 10*a*, 10*b*, 10*c*, 10*d*.

Figures 12A, 12B:
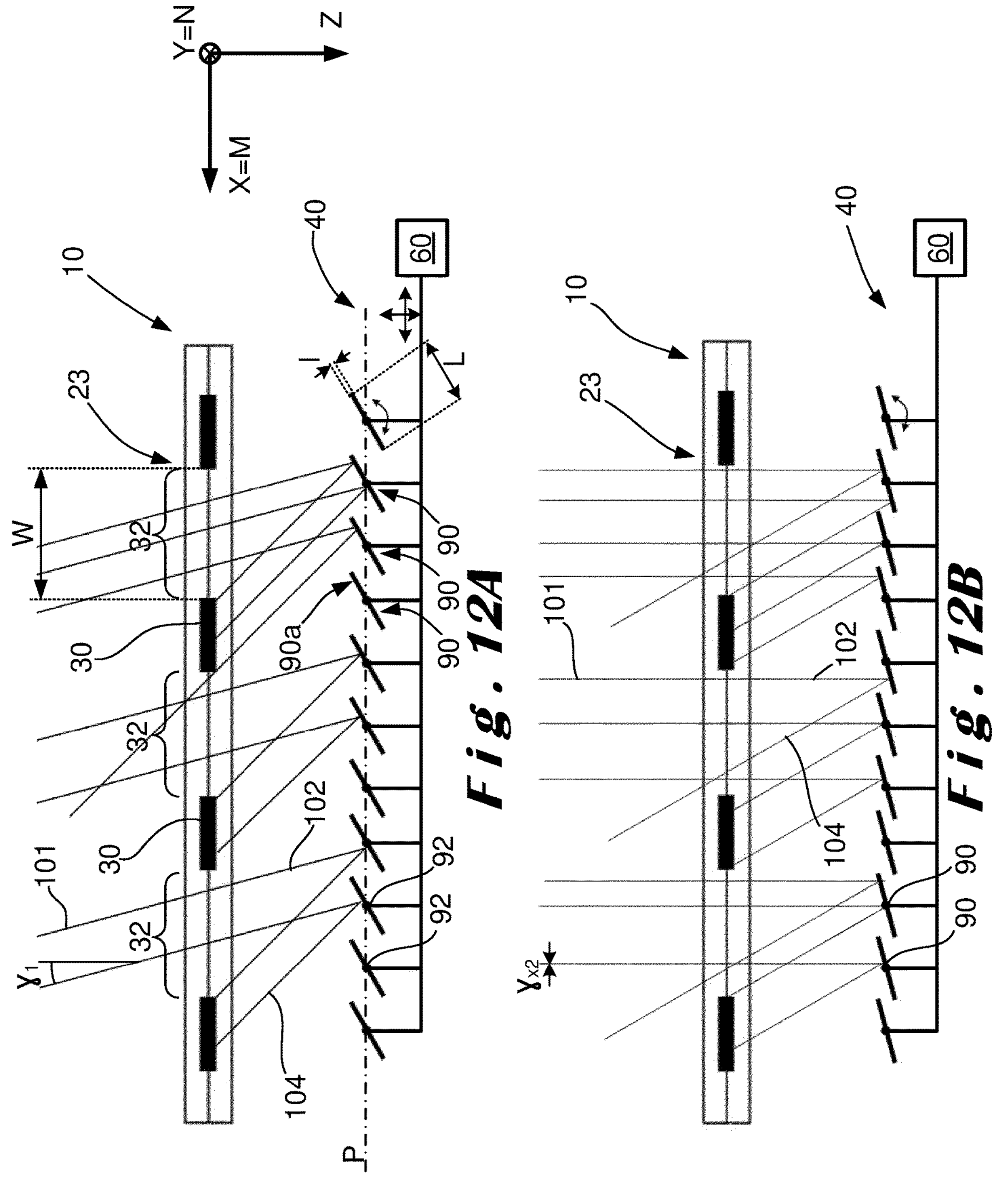

FIGS. 12A and 12B illustrate an optomechanical system 10 according to a further embodiment of the present invention. An optical arrangement 40 of the optomechanical system 10 is here formed of a plurality of separate reflective optical elements 90 located in an actuation plane P, advantageously a plane parallel to the photovoltaic modules 23, with the reflective optical elements 90 preferably aligned along one or more rows and/or columns.

Each reflective optical element 90 comprises a reflective surface 90*a* and is pivotably mounted around one axis 92, so that an inclination of the reflective surface 90*a* with respect to the actuation plane P is adjustable, allowing controlling the amount of transmitted light provided to the crops C and redirected towards the photovoltaic module 23.

The control system 60 is configured to operate rotation of the optical elements 90 around their rotation axes 92. As illustrated in FIG. 12A, the control system 60 may also be configured to translate the optical elements 90 in the lateral direction X, and/or in the transversal direction Z.

The control system 60 may be configured to operate rotation and/or translation of each optical element 90 individually. As an alternative, the control system 60 may be configured to operate rotation and/or translation of a plurality of optical elements 90 collectively, preferably of all optical elements 90 of each optical arrangement 40 collectively.

Advantageously, each optical element 90 is a thin element, for example a planar or substantially planar blade. In a plane perpendicular to its rotation axis 92, the optical element 90 has a maximum dimension L in a first direction and this maximum dimension is much larger, preferably at least 2 times larger, more preferably at least 10 times larger, than the dimension I thereof in a perpendicular direction. In the particular illustrated example, each optical element 90 is a flat elongated mirror.

The axis of rotation 92 of each optical element 90 is preferably parallel to the actuation plane P, and parallel to the longitudinal direction N of a gap 32 of the photovoltaic module 23.

In the illustrated embodiment, the axis of rotation 92 is located substantially at the centre of the optical element 90, and facing a gap 32 of the photovoltaic module 23.

Also, in this particular example, the maximum width L of each optical element 90, measured in a plane perpendicular to the rotation axis 92, is smaller than the width W of a gap 32 measured in the same plane, in lateral direction X.

Advantageously, the optical elements 90 may be rotated at substantially 90° so that their reflective surface(s) be substantially parallel to the transmitted light 102 in one configuration of the optical arrangement 40 and perpendicular to the transmitted light 102 in another configuration thereof. The orientation of the or each optical element 90 may also be more finely adjusted depending on the incidence angle of the sunlight, for example to focus reflected light towards the cells. For example, FIGS. 12A and 12B illustrate the same optomechanical system 10 in situations where an incidence angle of sunlight is different (γ1 in FIG. 12A and γ2 in FIG. 12B): an orientation of the optical elements 90 is modified to keep the reflected light focused towards the cells.

The amount of transmitted light which gets intercepted by the optical elements 90 (or the apparent area of the optical elements "seen" by the transmitted light) may so be controlled efficiently. This embodiment is advantageous to redirect light more effectively towards the photovoltaic cells on a broader range of incidence angles, and therefore to maximize electricity production.

The shape or optical properties of each optical element 90, or the way of its attachment to the rotation axis may be adjusted to the particular needs.

Figure 13A:
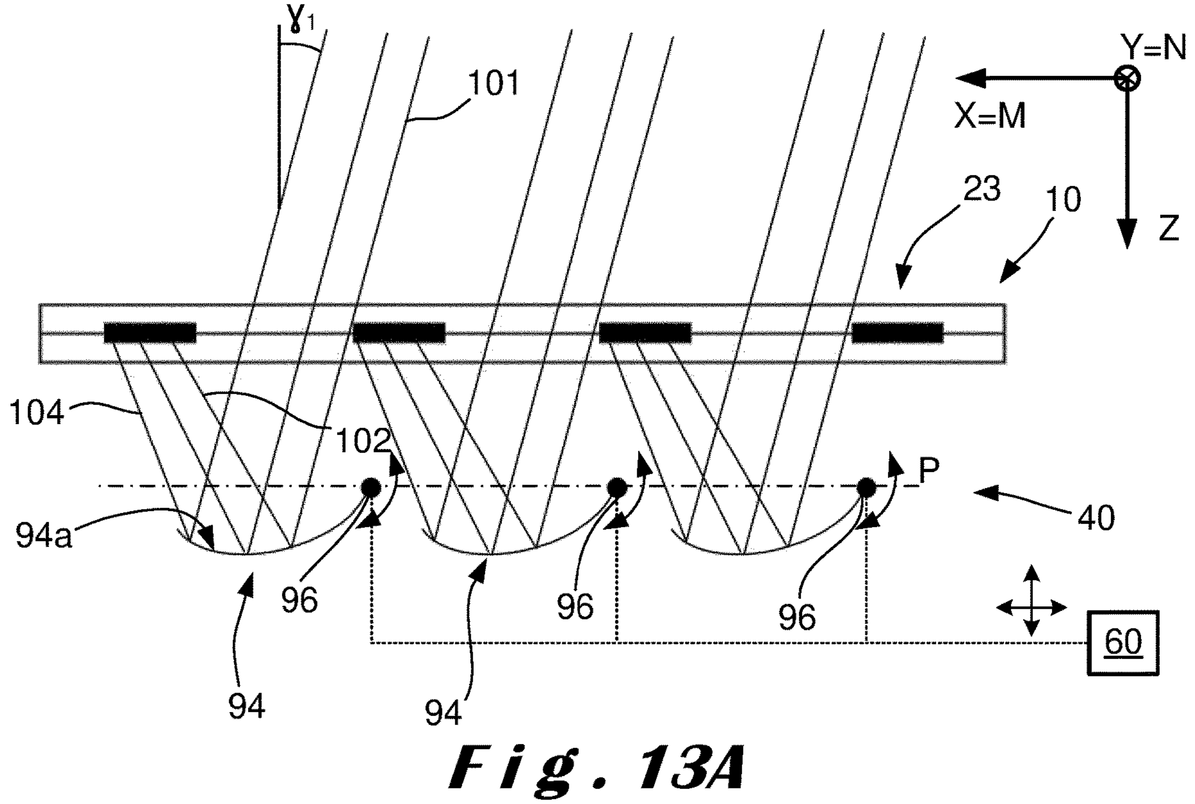
Figure 13B:
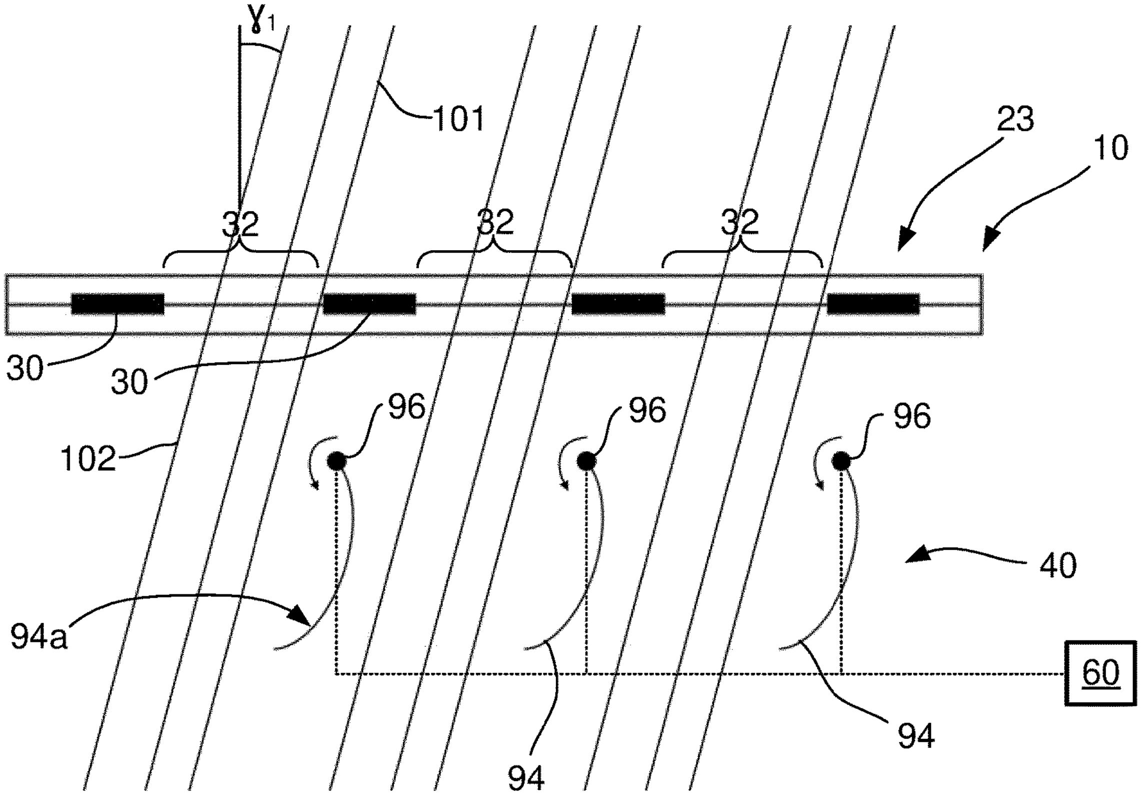

FIGS. 13A and 13B illustrate another possible optical arrangement 40 having a plurality of pivotable optical elements 94 with non-planar reflective surfaces 94*a*.

In said example, each optical element 94 has a paraboloidal shape with a concave reflective surface 94*a*.

In such embodiment and as illustrated in the figures, it is advantageous that the axis of rotation 96 of an optical element be offset from the middle of the at least one optical element 94. In particular, the axis of rotation may be located substantially at an end of the optical element 94, and facing one photovoltaic cell 30. In a deployed configuration of the optical arrangement 40 as shown in FIG. 13A, with the reflective surfaces 94*a* extending substantially parallel to the actuation plane P, a maximum amount of light is reflected on the optical elements 94. To optimize the amount of reflected light impinging on the cells, the inclination angle of the optical elements 94 might be adjusted. In a retracted configuration of the optical arrangement 40, with the reflective surfaces 94*a* substantially perpendicular to the actuation plane P to minimize a total projected area of the optical elements 94 on plane P, as shown in FIG. 13B, each optical element 94 becomes almost entirely hidden behind a cell 30.

Like in the previous embodiments, the control system 60 actuates the optical arrangement 40 to rotate the optical elements 94 around their rotation axes 96, individually or in batches or collectively, and eventually translate them in the lateral direction X, and/or in the transversal direction Z, to manage incident light passing through the gaps 32 of the photovoltaic modules 23, either for energy conversion or lighting underneath the system.

Figure 14A:
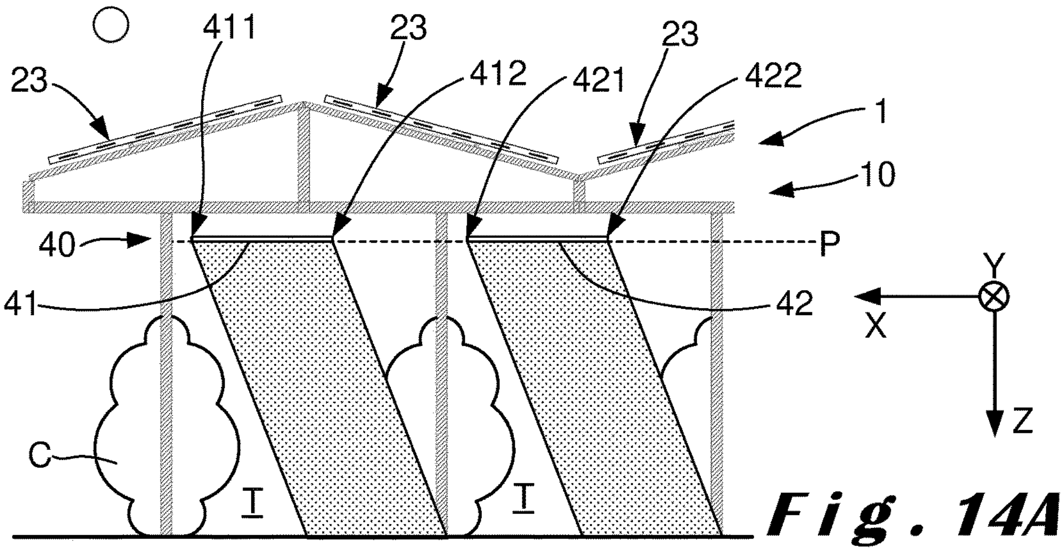
Figure 14B:
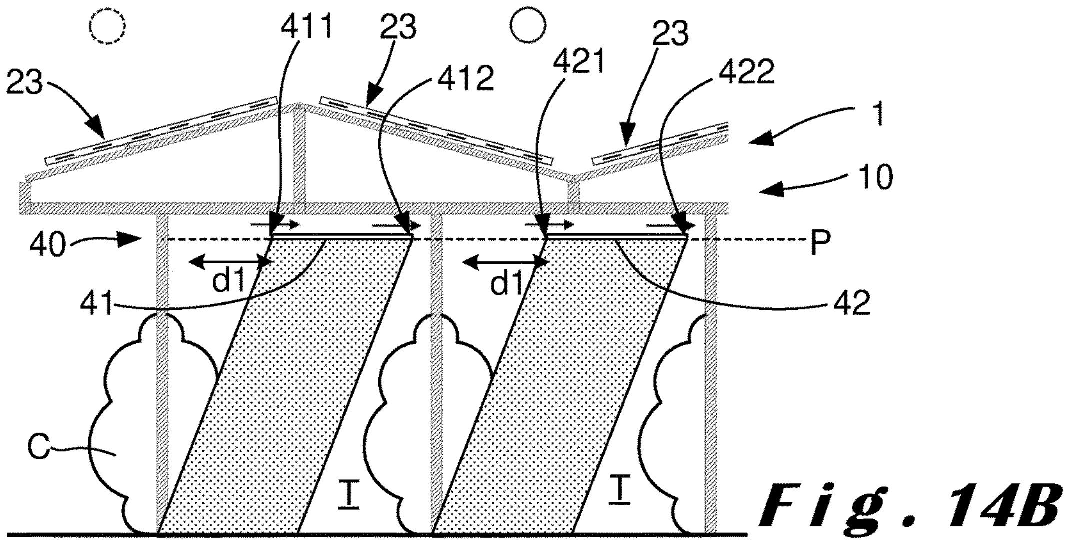
Figure 14C:
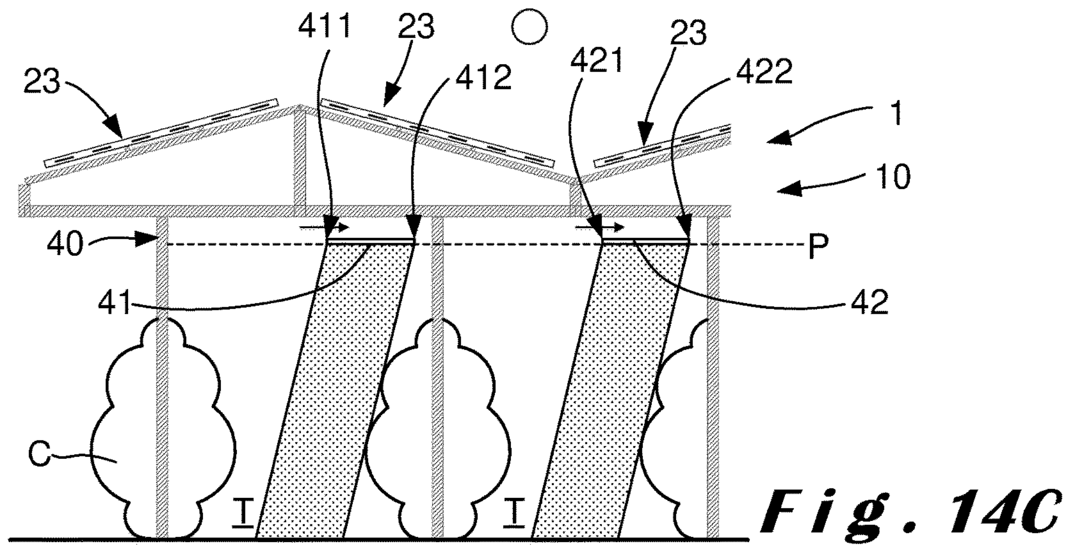

FIGS. 14A to 14C schematically illustrate an installation 1 with an optomechanical system 10 according to a thirteenth embodiment of the invention.

In the illustrated embodiment, the system 10 includes photovoltaic modules 23 of the type described in previous embodiments, and one optical arrangement 40 here comprising two deformable curtains 41, 42 defined in a same actuation plane P and operatable by a control system (not shown). According to alternative examples, the system 10 may include several optical arrangements defined in different, preferably parallel, actuation planes. Also, an/each optical arrangement 40 may comprise one single curtain or more than two curtains.

According to the invention, each curtain 41, 42 comprises at least one reflective optical element and is reversibly at least partially retractable or deployable in the retracting direction X parallel to the actuation plane P.

The curtains 41, 42 may take any form described with reference to the several aforementioned embodiments.

Also, the control system may be configured indifferently to fold or to roll the curtain upon retraction.

According to this thirteenth embodiment, the optical arrangement 40 is further configured so that the first ends 411, 421 and second ends respectively 412, 422 of each curtain 41, 42, defined in the retracting direction, are individually movable. Further, in this embodiment, each deformable curtain 41, 42 is translatable as a whole in the retracting direction X.

According to this embodiment, the control system (not shown in the figures) allows different control modes of each curtain 41, 42 of the optical arrangement 40:

a deployment/retraction mode, in which the effective surface of the curtain 41, 42 and a projected area S of said curtain 41, 42 on the actuation plane P is adjusted by moving only one end of said curtain or both ends relatively to each other (generally in opposite direction), a translation mode, in which the effective surface of the curtain 41, 42 remains constant but the position of the whole curtain is adjusted by jointly translating both ends thereof, i.e. at the same time, in the same retracting direction and sense, and on a same distance.

Translation mode may occur when a curtain is in a retracted position and/or a fully deployed position and/or, as illustrated in FIGS. 14A and 14B, in a partially retracted position. However, preferably, each curtain 41, 42 is translatable in any position.

By translating the curtains 41, 42, it is possible to more precisely control the amount of light transmitted for example to crops C located underneath the system 10. The shadow created by each curtain 41, 42 may be positioned at will at each time of the day. For example, all along the day, it might be wished to shade a path T between crops C without shading the crops themselves, to lower temperature but maintain the amount of direct light transmitted to the crops. Depending on the time of the day, the position of the sun changes and so the position of the curtains 41, 42 needs to be adjusted.

In a case as illustrated where the optical arrangement 40 comprises two or more curtains 41, 42, the control system may be configured to actuate each curtain individually and independently of the others. In particular, the control system may be configured to actuate one curtain in one of the two aforementioned modes and another one in a different mode. The control system may also be configured to actuate all curtains jointly in the same mode and manner.

FIG. 14A illustrates the system during morning time, and shows the shadows created by the curtains 41, 42 due to the morning position of the sun.

FIG. 14B illustrates the same system during the afternoon. The projection direction of the shadow has changed with the position of the sun. With the initial position of the curtains 41, 42 (illustrated in FIG. 14A), the crops would be entirely shaded. In order to optimize the amount of direct sunlight provided to the crops C, the curtains 41, 42 have been translated by a distance d1 in the lateral direction, to increase an amount of direct sunlight on the crops.

As shown in FIG. 14B, each curtain 41, 42 has been translated as a whole with a distance (measured in the retracting direction) between both ends respectively 411, 412 and 421, 422 being kept constant. The control system has for example actuated movement of the two opposite ends of each curtain 41, 42 simultaneously in the same retracting direction X and sense and on a same distance d1.

FIG. 14C illustrates the system of FIGS. 14A and 14B in still another configuration where the curtains 41, 42 have been retracted after translation, by translation of the first end 411, 421 thereof (the second 412, 422 remaining in position). A combination of both translation mode and retraction/deployment mode allows the system 10 to reach an optimum position where the best balance is found between an amount of direct light transmitted to the crops C, a shaded surface and a position of said shaded surface.

Typically, the control system comprises a displacement system configured to reversibly retract or deploy the curtain, and/or translate the curtain. Said displacement system may for example comprise duplicated transmission means for translating respectively the first and the second end of each curtain. Although not limiting, an example of an adapted system will be described hereafter with reference to FIGS. 15A to 15D.

FIGS. 15A to 15D illustrate an optical arrangement 40 with one deformable curtain 41 and a control system 60 including displacement means 170 allowing the movement of both ends 411, 412 of the curtain 41, for either retracting or deploying the curtain 41, or translating said curtain 41 as a whole in the retracting direction X.

Such displacement system 170 here comprises duplicated transmission means respectively connected—in a solidary manner—to a first end 411 and a second end 412 of the curtain 41.

Figure 15A:
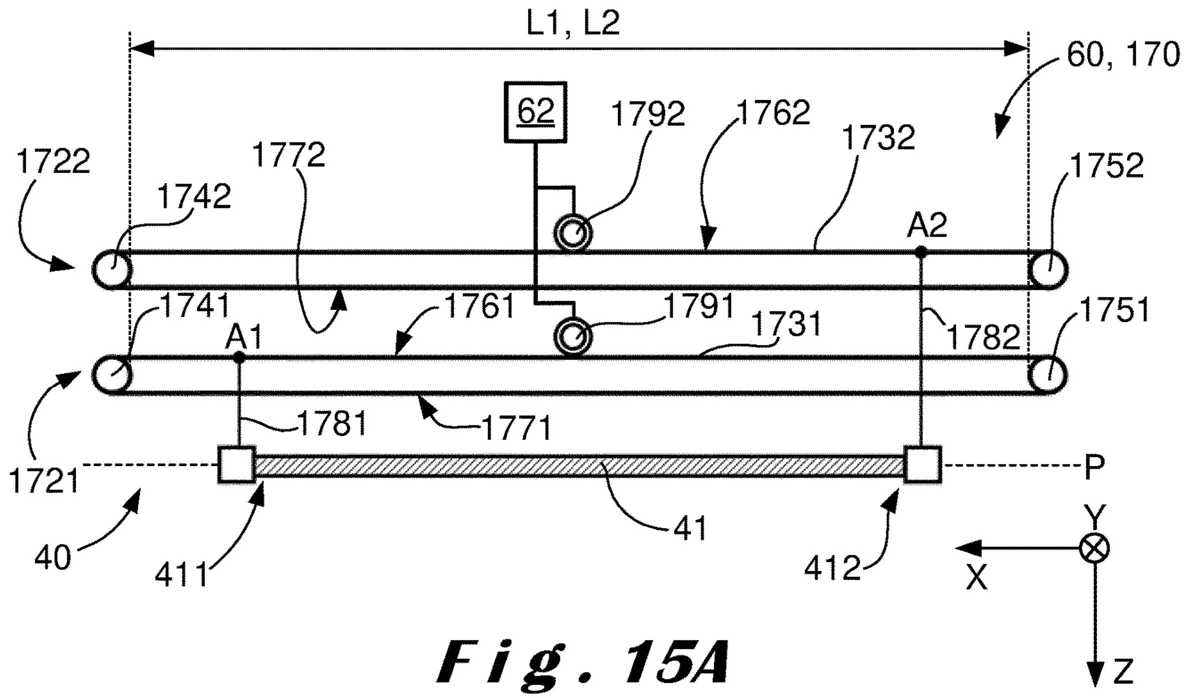

As shown in FIG. 15A, a first transmission system 1721, connected to an actuator 62, is configured to put into motion the first end 411 of the curtain 41.

In this example, the first transmission system 1721 comprises an elongated flexible component 1731 movably mounted between two rotatable supports 1741, 1751.

In the particular example, the component 1731 is an endless component such as an endless belt or cable and the rotatable supports 1741, 1751 are shafts or wheels or pulleys. The component 1731 so forms two rectilinear and parallel strands 1761, 1771, one of which (here the upper strand 1761) is defined as a so-called useful section which function will be explained hereafter.

As illustrated, the first end 411 of the curtain 41 is solidary with the rectilinear useful section 1761 of the endless component 1731.

In particular, the first end 411 of the curtain 41 is attached, by a rod 1781 or any other adapted connection element, to a first attachment part A1 of the useful section 1761.

The first transmission system 1721 further comprises a first driving wheel 1791, adapted to move the endless component 1731 in one sense or the opposite, depending on the signal of the actuator 62 to which it is connected.

A second transmission system 1722, connected to the same actuator 62, is configured to put into motion the second end 142 of the curtain 42.

Said transmission system 1722 is identical to the first transmission system 1721:

It comprises an elongated flexible endless component 1732 movably mounted between two rotatable supports 1742, 1752, such as shafts or wheels or pulleys.

The component 1732 forms parallel strands 1762, 1772, and one of said strands (1762) forms a useful section, an attachment part A2 of which is solidary with the second end 412 of the curtain 41, via a rod 1782 or any other adapted connection element.

The second transmission system 1722 further comprises a second driving wheel 1792, adapted to move the endless component 1732 in one sense or the opposite, depending on the signal of the actuator 62 to which it is connected.

Although not illustrated, the curtain may be either foldable or windable.

Is the curtain folded, then the displacement system 170 may advantageously comprise additional guiding means for the curtain along the retracting direction X. The guiding means may for example comprise tight cables, extending in the retracting direction, located above and/or under the curtain, and on which the curtain is slidingly mounted, for example through eyelets or any similar elements.

Is the curtain rolled, then the first and/or second end may be rotatably mounted around a winding axis, preferably provided with a self-winding system. In such case, such winding axis may be attached to the connecting rod 1781, 1782.

As shown in the figures, components 1731, 1732 are so positioned with respect to the actuation plane P that the useful sections thereof 1761, 1762 are substantially parallel to the retracting direction X.

Both transmission systems 1721 and 1722 are superimposed in a transverse direction Z and, in projection in the actuation plane P, the length respectively L1, L2 of each useful section 1761, 1762 is at least equal to the length of the required movement range of the curtain 41.

In a configuration where the curtain 41 is deployed at a maximum, as illustrated in FIG. 15A, the first attachment part A1 is in its closest position to the first rotatable support 1741 of the first component 1731 and the second attachment part A2 is in its closest position to the second rotatable support 1752 of the second component 1732.

Figure 15B:
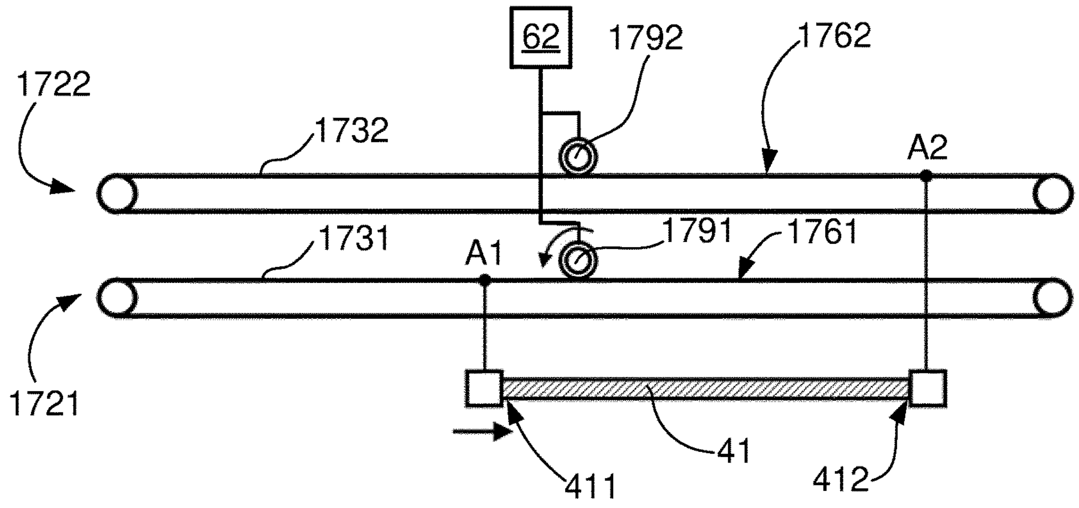

As shown in FIG. 15B, rotation of the driving wheel 1791 counterclockwise leads the useful section 1761 and so the first end 411 of the curtain 41 towards the second end 412. The curtain 41 is retracted.

Figure 15C:
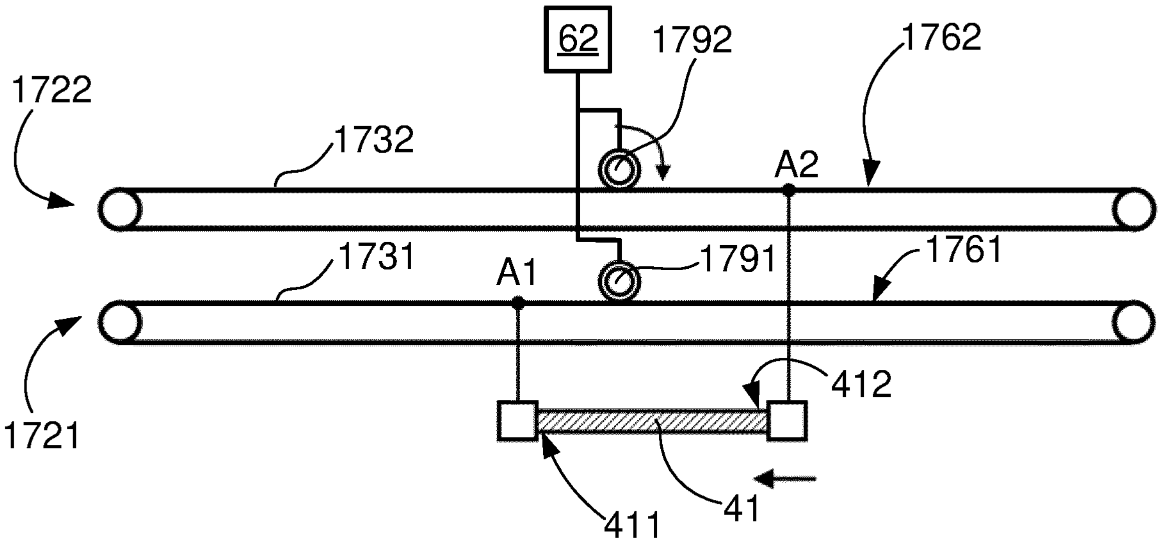

As shown in FIG. 15C, clockwise rotation of the driving wheel 1792 leads the useful section 1762 and so the second end 412 of the curtain 41 towards the first end 411. The curtain 41 is still more retracted.

Figure 15D:
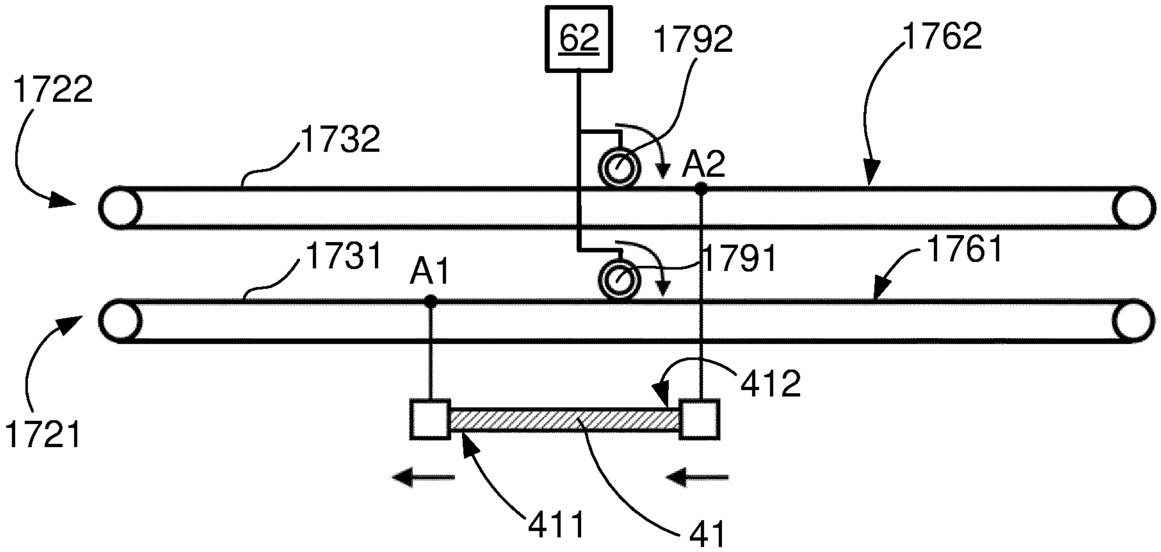

As shown in FIG. 15D, a joint rotation of both driving wheels 1791, 1792, induces a symmetrical movement of the first and second components 1731, 1732 and hence a translation of both first and second ends 411, 412 of the curtain 41. The curtain 41 is translated as a whole, without further retraction or deployment thereof.

In these thirteenth and fourteenth embodiments, the curtains may take any adapted form, and their retraction may occur either by pleating, or winding, or any other adapted manner.

Also, according to a particular embodiment, in a case as illustrated in FIGS. 14A to 14C where an optical arrangement 40 comprises two or more curtains 41, 42 and where the control system is configured to actuate all curtains jointly in the same mode and manner, each transmission system of the type described in reference to FIGS. 15A to 15D may be arranged to move a plurality of curtains in parallel: For example, provided the elongated component of each transmission system be properly dimensioned, a first end of each curtain may be connected to the useful section of the first transmission system and a second end of each curtain may be connected to the useful section of the second transmission system. A movement of the first elongated component may then induce a simultaneous movement of each curtain at its first end. And similarly, a movement of the second elongated component may induce a simultaneous movement of each curtain at its second end.

The invention claimed is:

1. An optomechanical system for light regulation and electricity production, the optomechanical system comprising:

- a semi-transparent photovoltaic module comprising a plurality of bifacial photovoltaic cells arranged in rows and columns, with gaps between the rows or columns or both, the photovoltaic module being configured so that at least part of sunlight incident on a front side thereof will be transmitted through said gaps,
- an optical arrangement located in an actuation plane behind the semi-transparent photovoltaic module, the optical arrangement comprising a reflective optical element having a reflective surface adapted to redirect at least part of the transmitted sunlight towards a back side of the semi-transparent photovoltaic module opposed to said front side, and
- a control system configured to operate the optical arrangement to adjust a projected area of said reflective optical element on said actuation plane, wherein said optical arrangement comprises a deformable curtain comprising said reflective optical element, and the control system is configured to reversibly at least partially retract or deploy said deformable curtain in a retracting direction parallel to the actuation plane,
- wherein both a first end and a second end of the deformable curtain, which ends extend in a direction perpendicular to the retracting direction, are movable in the retracting direction.

2. An optomechanical system for light regulation and electricity production, the optomechanical system comprising:

a semi-transparent photovoltaic module comprising a plurality of bifacial photovoltaic cells arranged in rows and columns, with gaps between the rows or columns or both, the photovoltaic module being configured so that at least part of sunlight incident on a front side thereof will be transmitted through said gaps, an optical arrangement located in an actuation plane behind the semi-transparent photovoltaic module, the optical arrangement comprising a reflective optical element having a reflective surface adapted to redirect at least part of the transmitted sunlight towards a back side of the semi-transparent photovoltaic module opposed to said front side, and a control system configured to operate the optical arrangement to adjust a projected area of said reflective optical element on said actuation plane, wherein said optical arrangement comprises a deformable curtain comprising said reflective optical element, and the control system is configured to reversibly at least partially retract or deploy said deformable curtain in a retracting direction parallel to the actuation plane, wherein both a first end and a second end of the deformable curtain are movable in the retracting direction, wherein the control system is configured to selectively operate the optical arrangement between a first and a second configuration, the projected area of said reflective optical element in the second configuration being less than 50% of the projected area of said optical element in the first configuration.

3. The optomechanical system according to claim 1, comprising at least two said optical arrangements arranged in different actuation planes one above the other.

4. The optomechanical system according to claim 1, wherein the control system includes an actuator and a transmission system for translating said first end of the curtain in the retracting direction upon actuation of said actuator, said transmission system comprising an elongated flexible component movably mounted around at least two rotatable supports and defining a useful section between said supports, and a connecting element connecting said end of the curtain to said useful section.

5. The optomechanical system according to claim 1, wherein both ends of said curtain are individually movable in the retracting direction.

6. The optomechanical system according to claim 1, wherein the control system includes an actuator and first and second transmission systems, each said transmission system including an elongated flexible component movably mounted around at least two rotatable supports and defining a useful section between said supports and a connecting element for connecting an end of the curtain to said useful section.

7. The optomechanical system according to claim 1, wherein, in a deployed configuration, said deformable curtain intercepts substantially all sunlight transmitted through the photovoltaic module.

8. The optomechanical system according to claim 1, wherein the deformable curtain is at least partially formed of a sheet having an upper surface comprising reflective material.

9. An optomechanical system for light regulation and electricity production, the optomechanical system comprising:

a semi-transparent photovoltaic module comprising a plurality of bifacial photovoltaic cells arranged in rows and columns, with gaps between the rows or columns or both, the photovoltaic module being configured so that at least part of sunlight incident on a front side thereof will be transmitted through said gaps, an optical arrangement located in an actuation plane behind the semi-transparent photovoltaic module, the optical arrangement comprising a reflective optical element having a reflective surface adapted to redirect at least part of the transmitted sunlight towards a back side of the semi-transparent photovoltaic module opposed to said front side, and a control system configured to operate the optical arrangement to adjust a projected area of said reflective optical element on said actuation plane, wherein said optical arrangement comprises a deformable curtain comprising said reflective optical element, and the control system is configured to reversibly at least partially retract or deploy said deformable curtain in a retracting direction parallel to the actuation plane, wherein both a first end and a second end of the deformable curtain are movable in the retracting direction, wherein the control system comprises a folding system for folding the deformable curtain.

10. The optomechanical system according to claim 1, wherein said reflective optical element comprises at least two adjacent planar angle-forming faces.

11. The optomechanical system according to claim 1, wherein said reflective optical element has a spectrally selective reflectivity and/or transmission.

12. The optomechanical system according to claim 1, wherein the control system comprises a sensor and a computer system configured to receive a signal provided by the sensor and to control the optical arrangement based on such signal, according to a feedback loop.

13. An agricultural installation comprising a supporting structure arranged above crops and the optomechanical system according to claim 1 attached to said supporting structure.

14. A method of managing the agricultural installation according to claim 13, comprising the steps of:

determining a parameter representative of environmental conditions below or around the optomechanical system, and/or of an electrical production of the photovoltaic module of said optomechanical system, and actuating the optical arrangement of said optomechanical system depending on said parameter.

15. The method according to claim 14, wherein the actuating step comprises at least partially retracting or deploying said deformable curtain in the retracting direction.

16. The method according to claim 15, further comprising translating the deformable curtain as a whole in the retracting direction.

17. The method according to claim 14, wherein the determining step includes determining a first parameter representative of a temperature in an environment of the crops and a second parameter representative of an amount of direct light impinging on the crops, and the actuating step includes actuating the optical arrangement to minimize the first parameter and maximize the second parameter.

18. The optomechanical system according to claim 1, wherein the first and second ends are spaced from one another along the retracting direction.

* * * * *